(12) United States Patent
Lim et al.

(10) Patent No.: US 12,711,683 B2
(45) Date of Patent: Aug. 18, 2026

(54) DYNAMIC ANIMATION BASED ON WAITING PERIOD

(71) Applicant: The Toronto-Dominion Bank, Toronto (CA)

(72) Inventors: Jung Sook Lim, Markham (CA); Susan Marjorie Juvet, Toronto (CA); Emily Anne Lowther, Elmira (CA); Claire Iona Wilcox, Toronto (CA); Ethel Zlotnik Chavez, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 159 days.

(21) Appl. No.: 18/412,435

(22) Filed: Jan. 12, 2024

(65) Prior Publication Data

US 2025/0232503 A1 Jul. 17, 2025

(51) Int. Cl.
*G06T 13/00* (2011.01)
*G06V 40/16* (2022.01)

(52) U.S. Cl.
CPC ............ *G06T 13/00* (2013.01); *G06V 40/176* (2022.01); *G06T 2213/08* (2013.01)

(58) Field of Classification Search
CPC ... G06T 13/00; G06T 2213/08; G06V 40/176; G06F 2203/011; G06F 3/0481; G06F 3/04895; G06N 3/047; G06N 3/08; G06N 20/00
See application file for complete search history.

(56) References Cited

U.S. PATENT DOCUMENTS

| | | | |
|---|---|---|---|
| 9,058,189 | B1 | 6/2015 | Queru |
| 9,472,009 | B2 | 10/2016 | Bostick et al. |
| 9,710,949 | B2 | 7/2017 | Bostick et al. |
| 9,864,982 | B2 | 1/2018 | Bristow et al. |
| 10,115,217 | B2 | 10/2018 | Boeke et al. |
| 10,163,085 | B2 | 12/2018 | D'Agostino et al. |
| 10,178,246 | B1 | 1/2019 | Horvath et al. |
| 10,181,114 | B2 | 1/2019 | Tseretopoulos et al. |
| 10,339,931 | B2 | 7/2019 | Tseretopoulos et al. |
| 10,346,824 | B2 | 7/2019 | Chan et al. |
| 10,360,303 | B2 | 7/2019 | Volkovs et al. |
| 10,405,146 | B1 | 9/2019 | Kuruvilla et al. |

(Continued)

OTHER PUBLICATIONS

Heglin et al., "Auto-Adjudication Process Via Machine Learning," U.S. Appl. No. 19/053,942, filed Feb. 14, 2025.

*Primary Examiner* — Said Broome
*Assistant Examiner* — Jordan Wan Yick

(57) ABSTRACT

An example operation may include one or more of receiving context of a user during an inquiry of a feature via a software application, executing a waiting period via the software application, during the waiting period, selecting an animation to display via the software application based on the context of the user and the feature inquiry wherein the animation provides contextual data associated with the feature, wherein the contextual data is based on a determined need of the user, displaying the animation via the software application during the waiting period, and determining if the user has accepted the feature via the software application. At least one portion of the example operation: integrates with an artificial intelligence (AI) chatbot, interacts with the AI chatbot, is performed by the AI chatbot, and/or is associated with an AI model.

20 Claims, 20 Drawing Sheets

(56) References Cited

U.S. PATENT DOCUMENTS 10,438,206 B2 10/2019 Jivraj et al.
10,440,196 B2 10/2019 Horvath et al.
10,440,197 B2 10/2019 Horvath et al.
10,460,748 B2 10/2019 Tseretopoulos et al.
10,482,675 B1 11/2019 Sutter et al.
10,580,046 B2 3/2020 Gangloff et al.
10,659,400 B2 5/2020 Moon et al.
10,698,902 B2 6/2020 Tseretopoulos et al.
10,706,635 B2 7/2020 Sutter et al.
10,708,721 B2 7/2020 Kuruvilla et al.
10,728,259 B2 7/2020 McCarter et al.
10,776,619 B2 9/2020 Collinson et al.
10,810,249 B2* 10/2020 Shaw ................ G06Q 30/0282
10,824,941 B2 11/2020 Volkovs et al.
10,831,923 B2 11/2020 Dunjic et al.
10,832,047 B2 11/2020 Moghtadai
10,862,897 B2 12/2020 D'Agostino et al.
10,867,292 B2 12/2020 Lin et al.
10,867,293 B2 12/2020 Bristow et al.
10,878,816 B2 12/2020 Tseretopoulos et al.
10,902,220 B2 1/2021 Lozon et al.
10,922,665 B2 2/2021 Miller et al.
10,943,605 B2 3/2021 Tseretopoulos et al.
10,977,617 B2 4/2021 Tseretopoulos et al.
10,984,579 B2 4/2021 Leong et al.
11,004,187 B2 5/2021 Kuruvilla et al.
11,017,028 B2 5/2021 Dunjic et al.
11,030,415 B2 6/2021 Volkovs et al.
11,055,924 B2 7/2021 Navarro et al.
11,061,638 B2 7/2021 Lam
11,070,448 B2 7/2021 Miller et al.
11,087,314 B2 8/2021 Gandhi et al.
11,100,168 B2 8/2021 Miller et al.
11,140,143 B2 10/2021 Moon et al.
11,144,921 B2 10/2021 Dunjic et al.
11,144,998 B2 10/2021 Kuruvilla et al.
11,145,169 B2 10/2021 Pratten et al.
11,146,442 B1 10/2021 Harris
11,182,860 B2 11/2021 Kuruvilla et al.
11,200,328 B2 12/2021 Shpurov et al.
11,200,411 B2 12/2021 Rizvi et al.
11,210,857 B2 12/2021 Rizvi et al.
11,222,286 B2 1/2022 Choe et al.
11,232,304 B2 1/2022 Navarro et al.
11,276,257 B2 3/2022 Moghtadai et al.
11,303,642 B2 4/2022 Dunjic et al.
11,334,574 B2 5/2022 Caputo et al.
11,347,744 B2 5/2022 Tseretopoulos et al.
11,349,871 B2 5/2022 Moon et al.
11,354,442 B2 6/2022 Haldenby et al.
11,361,566 B2 6/2022 Collinson et al.
11,373,229 B2 6/2022 Tseretopoulos et al.
11,392,776 B2 7/2022 Lozon et al.
11,393,020 B2 7/2022 Mathew et al.
11,394,668 B1 7/2022 Subbunarayanan et al.
11,397,765 B2 7/2022 Volkovs et al.
11,409,811 B2 8/2022 D'Agostino
11,411,734 B2 8/2022 Shpurov et al.
11,430,242 B2 8/2022 Moghtadai
11,436,809 B2 9/2022 Rizvi et al.
11,451,669 B1 9/2022 Navarro et al.
11,469,878 B2 10/2022 Shpurov et al.
11,470,091 B2 10/2022 McCarter et al.
11,470,143 B2 10/2022 Joheb et al.
11,475,059 B2 10/2022 Liu et al.
11,475,251 B2 10/2022 Morin et al.
11,477,265 B2 10/2022 McPhee et al.
11,507,622 B2 11/2022 Grebenisan et al.
11,507,868 B2 11/2022 Kwong et al.
11,546,345 B2 1/2023 D'Agostino et al.
11,580,762 B2 2/2023 Rizvi et al.
11,600,064 B2 3/2023 Navarro et al.
11,604,899 B2 3/2023 Haldenby et al.
11,620,741 B2 4/2023 Kuruvilla et al.
11,632,311 B2 4/2023 Miller et al.
11,651,100 B2 5/2023 Dunjic et al.
11,663,488 B2 5/2023 Volkovs et al.
11,671,536 B2 6/2023 Navarro et al.
11,687,995 B2 6/2023 Tseretopoulos et al.
11,689,484 B2 6/2023 Moon et al.
11,704,782 B2 7/2023 Wakim et al.
11,741,305 B2 8/2023 Skaljin et al.
11,743,210 B2 8/2023 Moon et al.
11,748,400 B2 9/2023 Volkovs et al.
11,756,388 B2 9/2023 Pratten et al.
11,777,918 B2 10/2023 Moon et al.
11,782,935 B2 10/2023 Caputo et al.
11,789,909 B2 10/2023 Grebenisan et al.
11,790,012 B2 10/2023 D'Agostino
11,790,354 B2 10/2023 Gandhi et al.
11,797,962 B2 10/2023 Jones et al.
11,809,486 B2 11/2023 Liu et al.
11,809,577 B2 11/2023 Begg et al.
11,811,826 B2 11/2023 Moon et al.
11,842,252 B2 12/2023 Kuang et al.
11,875,398 B2 1/2024 Pratten et al.
11,880,811 B2 1/2024 Pawelkiewicz et al.
11,886,764 B2 1/2024 Lam
11,928,112 B2 3/2024 Dunjic et al.
11,941,525 B2 3/2024 Morin et al.
11,941,703 B2 3/2024 Kuruvilla et al.
11,955,117 B2 4/2024 McDermid et al.
11,966,491 B2 4/2024 D'Agostino
11,978,085 B2 5/2024 Rai et al.
11,978,090 B2 5/2024 Navarro et al.
11,985,153 B2 5/2024 Karl
11,995,121 B2 5/2024 Volkovs et al.
12,008,315 B2 6/2024 Miller et al.
12,014,303 B2 6/2024 Carvalho et al.
12,019,594 B2 6/2024 Floyd et al.
12,021,874 B2 6/2024 Dunjic et al.
12,039,535 B2 7/2024 Dunjic et al.
12,052,363 B2 7/2024 Shpurov et al.
12,061,652 B2 8/2024 Miller et al.
12,067,130 B2 8/2024 Shpurov et al.
12,067,580 B2 8/2024 Jeske et al.
12,079,351 B2 9/2024 Begg et al.
12,106,220 B2 10/2024 Volkovs et al.
12,111,793 B2 10/2024 Grebenisan et al.
12,124,925 B2 10/2024 Rho et al.
12,136,079 B2 11/2024 Jones et al.
12,164,542 B1 12/2024 Rahman et al.
12,169,693 B2 12/2024 Lu
12,182,800 B2 12/2024 Navarro et al.
12,198,109 B2 1/2025 Abbas
12,198,510 B2 1/2025 Pratten et al.
12,210,534 B2 1/2025 Cashion et al.
12,211,274 B2 1/2025 Ma et al.
12,217,011 B2 2/2025 Luo et al.
12,223,549 B2 2/2025 Bouëtté et al.
12,229,690 B2 2/2025 Stanevich et al.
12,254,512 B2 3/2025 Heglin et al.
12,282,785 B2 4/2025 Karbasi et al.
12,288,236 B2 4/2025 Volkovs et al.
12,299,149 B2 5/2025 Nikoghossian et al.
12,316,715 B2 5/2025 Taheri et al.
12,321,861 B2 6/2025 Volkovs et al.
12,326,856 B2 6/2025 Mohammed et al.
12,333,354 B2 6/2025 Mohammed et al.
12,353,969 B2 7/2025 Kuang et al.
12,354,094 B2 7/2025 Jones et al.
12,373,795 B2 7/2025 Misler et al.
2011/0313884 A1 12/2011 Eze
2014/0257806 A1* 9/2014 Dykstra-Erickson ........................ G06T 13/00 704/235
2016/0180567 A1* 6/2016 Lee ......................... G06F 3/048 345/473
2016/0292901 A1* 10/2016 Li ......................... G06V 40/28
2018/0005223 A1* 1/2018 Terra .................... G06Q 20/341
2018/0020093 A1 1/2018 Bentitou et al.
2018/0268818 A1 9/2018 Schoenmackers et al.
2019/0172045 A1 6/2019 Dunjic et al.
2020/0058068 A1 2/2020 Gandhi et al.

(56) References Cited

U.S. PATENT DOCUMENTS

2021/0027160 A1 1/2021 Volkovs et al.
2021/0037040 A1 2/2021 Aleks et al.
2021/0117893 A1 4/2021 Sohum et al.
2021/0232950 A1 7/2021 Kono
2021/0264461 A1 8/2021 Fam
2021/0407016 A1 12/2021 Kuruvilla et al.
2022/0058489 A1 2/2022 Volkovs et al.
2022/0108069 A1 4/2022 Lee
2022/0157094 A1 5/2022 Moghtadai et al.
2022/0172083 A1 6/2022 Wu et al.
2022/0188705 A1 6/2022 Davoodi et al.
2022/0198411 A1 6/2022 Jones et al.
2022/0198432 A1 6/2022 Jones et al.
2022/0198445 A1 6/2022 Jones et al.
2022/0207295 A1 6/2022 Stanevich et al.
2022/0207430 A1 6/2022 Dickie et al.
2022/0207432 A1 6/2022 Whelan et al.
2022/0207606 A1 6/2022 Dickie et al.
2022/0245060 A1 8/2022 Kathuria et al.
2022/0270155 A1 8/2022 Volkovs et al.
2022/0277213 A1 9/2022 Braviner et al.
2022/0277227 A1 9/2022 Yu et al.
2022/0277323 A1 9/2022 Whelan et al.
2022/0284450 A1 9/2022 Asta et al.
2022/0300903 A1 9/2022 Huang et al.
2022/0309573 A1 9/2022 Mathew et al.
2022/0318573 A1 10/2022 Smith et al.
2022/0318617 A1 10/2022 Wong et al.
2022/0327397 A1 10/2022 Braviner et al.
2022/0327430 A1 10/2022 Zuberi et al.
2022/0327431 A1 10/2022 Braviner et al.
2022/0327432 A1 10/2022 Gutierrez Bugarin et al.
2022/0327625 A1 10/2022 Leung et al.
2022/0335718 A1 10/2022 Ma et al.
2022/0343422 A1 10/2022 Zuberi et al.
2022/0366064 A1 11/2022 Nikoghossian et al.
2022/0383301 A1 12/2022 Jones et al.
2022/0383313 A1 12/2022 Jones et al.
2022/0383314 A1 12/2022 Jones et al.
2022/0405299 A1 12/2022 Leung et al.
2022/0414495 A1 12/2022 Stanevich et al.
2023/0006809 A1 1/2023 Shpurov et al.
2023/0007075 A1 1/2023 McPhee et al.
2023/0011451 A1 1/2023 Lu
2023/0048437 A1 2/2023 Karbasi et al.
2023/0083899 A1 3/2023 Gandouet et al.
2023/0086653 A1 3/2023 Zykh et al.
2023/0107703 A1 4/2023 Zhang et al.
2023/0113752 A1 4/2023 Jorlett et al.
2023/0119108 A1 4/2023 Volkovs et al.
2023/0131935 A1 4/2023 Volkovs et al.
2023/0153461 A1 5/2023 Kalra et al.
2023/0195734 A1 6/2023 Cashion et al.
2023/0196406 A1 6/2023 Gandouet et al.
2023/0244917 A1 8/2023 Loaiza Ganem et al.
2023/0244962 A1 8/2023 Volkovs et al.
2023/0252301 A1 8/2023 Volkovs et al.
2023/0259883 A1 8/2023 Misler et al.
2023/0267367 A1 8/2023 Volkovs et al.
2023/0267475 A1 8/2023 Navarro et al.
2023/0274243 A1 8/2023 Jivan et al.
2023/0306434 A1 9/2023 Dunjic et al.
2023/0316485 A1 10/2023 Wakim et al.
2023/0318994 A1 10/2023 Moon et al.
2023/0336615 A1 10/2023 Joheb et al.
2023/0342481 A1 10/2023 Nikoghossian et al.
2023/0344814 A1 10/2023 Moon et al.
2023/0351116 A1 11/2023 Skaljin et al.
2023/0362656 A1* 11/2023 Jovanovic ........... G06F 3/04842
2023/0368048 A1 11/2023 Yang et al.
2023/0377047 A1 11/2023 Bouëtté et al.
2023/0385693 A1 11/2023 Cresswell et al.
2023/0385694 A1 11/2023 Cresswell et al.
2023/0386190 A1 11/2023 Cresswell et al.
2023/0394452 A1 12/2023 Jones et al.
2023/0401192 A1 12/2023 Yang et al.
2023/0401553 A1 12/2023 Navarro et al.
2023/0401572 A1 12/2023 Navarro et al.
2023/0419302 A1 12/2023 Navarro et al.
2023/0419402 A1 12/2023 Ghelichi et al.
2024/0020534 A1 1/2024 Perez Vallejo et al.
2024/0062117 A1 2/2024 Kuang et al.
2024/0106851 A1 3/2024 Kennedy et al.
2024/0119346 A1 4/2024 Chang et al.
2024/0126575 A1 4/2024 Kiriakou et al.
2024/0127036 A1 4/2024 Zuberi et al.
2024/0127214 A1 4/2024 Wander et al.
2024/0193562 A1 6/2024 Pratten et al.
2024/0202756 A1 6/2024 Karl et al.
2024/0203405 A1 6/2024 McDermid et al.
2024/0211732 A1 6/2024 Wander et al.
2024/0212049 A1 6/2024 Ghelichi et al.
2024/0220653 A1 7/2024 D'Agostino
2024/0232614 A1 7/2024 Esmaeili et al.
2024/0232950 A1 7/2024 Navarro et al.
2024/0249310 A1 7/2024 Rai et al.
2024/0256903 A1 8/2024 Ens et al.
2024/0256904 A1 8/2024 Leung et al.
2024/0256968 A1 8/2024 Hosseinzadeh et al.
2024/0265055 A1 8/2024 Purkayastha
2024/0281467 A1 8/2024 Volkovs et al.
2024/0281808 A1 8/2024 Vouitsis et al.
2024/0281818 A1 8/2024 Golestan Irani et al.
2024/0289645 A1 8/2024 Makhijani et al.
2024/0289876 A1 8/2024 Mathew et al.
2024/0303551 A1 9/2024 Li et al.
2024/0304182 A1 9/2024 Hamilton et al.
2024/0330772 A1 10/2024 Cresswell et al.
2024/0330809 A1 10/2024 Carvalho et al.
2024/0338520 A1 10/2024 Misler et al.
2024/0346338 A1 10/2024 Desai et al.
2024/0370880 A1 11/2024 Jeske et al.
2024/0370881 A1 11/2024 Jeske et al.
2024/0385838 A1 11/2024 Yu et al.
2024/0386295 A1 11/2024 Yu et al.
2024/0386325 A1 11/2024 Yu et al.
2024/0386326 A1 11/2024 Yu et al.
2024/0386427 A1 11/2024 Abbas et al.
2024/0394569 A1 11/2024 Farhadi Hassan Kiadeh et al.
2024/0394588 A1 11/2024 Heglan et al.
2024/0403702 A1 12/2024 Deljavan Farshi
2024/0403862 A1 12/2024 Abbas et al.
2024/0412069 A1 12/2024 Volkovs et al.
2024/0412078 A1 12/2024 Ghelichi et al.
2024/0412083 A1 12/2024 Starszyk et al.
2024/0419978 A1 12/2024 Stein et al.
2024/0420010 A1 12/2024 Cirulis et al.
2024/0420011 A1 12/2024 Cirulis et al.
2024/0428283 A1 12/2024 Belbahri et al.
2025/0013363 A1 1/2025 Estoesta et al.
2025/0013697 A1 1/2025 Estoesta et al.
2025/0013927 A1 1/2025 Rho et al.
2025/0014010 A1 1/2025 Jones et al.
2025/0014052 A1 1/2025 Bhattacharjee et al.
2025/0028852 A1 1/2025 Chowanski et al.
2025/0028934 A1 1/2025 Wong et al.
2025/0029012 A1 1/2025 Rho et al.
2025/0045601 A1 2/2025 Zuberi et al.
2025/0053387 A1 2/2025 Wang et al.
2025/0068646 A1 2/2025 Rahman et al.
2025/0068853 A1 2/2025 Lu
2025/0069063 A1 2/2025 Navarro et al.
2025/0077187 A1 3/2025 Guttridge et al.
2025/0077188 A1 3/2025 Guttridge et al.
2025/0077189 A1 3/2025 Guttridge et al.
2025/0077190 A1 3/2025 Guttridge et al.
2025/0077204 A1 3/2025 Guttridge et al.
2025/0077227 A1 3/2025 Guttridge et al.
2025/0077396 A1 3/2025 Sen
2025/0077397 A1 3/2025 Sen
2025/0077399 A1 3/2025 Sen
2025/0077400 A1 3/2025 Sen
2025/0077556 A1 3/2025 Guttridge et al.
2025/0077681 A1 3/2025 Sen

(56) References Cited

U.S. PATENT DOCUMENTS

2025/0077682 A1 3/2025 Guttridge et al.
2025/0077939 A1 3/2025 Tabatabaei et al.
2025/0078324 A1 3/2025 Gormley
2025/0078325 A1 3/2025 Gormley
2025/0078344 A1 3/2025 Gormley
2025/0078345 A1 3/2025 Gormley
2025/0078972 A1 3/2025 Gormley
2025/0085936 A1 3/2025 Guttridge et al.
2025/0086096 A1 3/2025 Guttridge et al.
2025/0086440 A1 3/2025 Erb et al.
2025/0086441 A1 3/2025 Guttridge et al.
2025/0086451 A1 3/2025 Guttridge et al.
2025/0086551 A1 3/2025 Zhao
2025/0094437 A1 3/2025 Upendran
2025/0103609 A1 3/2025 Upendran
2025/0103961 A1 3/2025 Cresswell et al.
2025/0103980 A1 3/2025 Deljavan Farshi et al.
2025/0104024 A1 3/2025 Abbas
2025/0104029 A1 3/2025 Deljavan Farshi et al.
2025/0104047 A1 3/2025 Mashkevich
2025/0104050 A1 3/2025 Mashkevich
2025/0104059 A1 3/2025 Mashkevich
2025/0104074 A1 3/2025 Tsang et al.
2025/0104306 A1 3/2025 Mashkevich
2025/0104700 A1 3/2025 Henault-Ethier et al.
2025/0106060 A1 3/2025 Gormley et al.
2025/0106201 A1 3/2025 Gormley
2025/0110805 A1 4/2025 Starszyk et al.
2025/0117411 A1 4/2025 Mohammed
2025/0117595 A1 4/2025 Taheri
2025/0117596 A1 4/2025 Taheri
2025/0117623 A1 4/2025 Devarajan et al.
2025/0117629 A1 4/2025 Pandey et al.
2025/0117630 A1 4/2025 Taheri
2025/0117769 A1 4/2025 Taheri
2025/0117836 A1 4/2025 Taheri et al.
2025/0117853 A1 4/2025 Pandey et al.
2025/0117854 A1 4/2025 Pandey et al.
2025/0117855 A1 4/2025 Pandey et al.
2025/0117856 A1 4/2025 Pandey et al.
2025/0119396 A1 4/2025 Taheri
2025/0119494 A1 4/2025 Pandey et al.
2025/0119495 A1 4/2025 Pandey et al.
2025/0124039 A1 4/2025 Cashion et al.
2025/0124240 A1 4/2025 Luo et al.
2025/0131718 A1 4/2025 Ma et al.
2025/0138838 A1 5/2025 Ramesh et al.
2025/0139267 A1 5/2025 Zykh et al.
2025/0139382 A1 5/2025 Mohammed et al.
2025/0139708 A1 5/2025 Bouëtté et al.
2025/0147733 A1 5/2025 Abbas et al.
2025/0148321 A1 5/2025 Stanevich et al.
2025/0165375 A1 5/2025 Cresswell et al.
2025/0165866 A1 5/2025 Cresswell et al.
2025/0173170 A1 5/2025 Glynn-Udrow et al.
2025/0173568 A1 5/2025 Cresswell et al.
2025/0173618 A1 5/2025 Cresswell et al.
2025/0173619 A1 5/2025 Cresswell et al.
2025/0173725 A1 5/2025 Devarajan et al.
2025/0181321 A1 6/2025 Gormley
2025/0182028 A1 6/2025 Gormley
2025/0182196 A1 6/2025 Gormley
2025/0182222 A1 6/2025 Gormley
2025/0191062 A1 6/2025 Heglin et al.
2025/0217175 A1 7/2025 Karbasi et al.
2025/0225560 A1 7/2025 Bajaj et al.
2025/0231668 A1 7/2025 Tao et al.
2025/0231750 A1 7/2025 Lim et al.
2025/0231774 A1 7/2025 Tao et al.
2025/0231775 A1 7/2025 Tao et al.
2025/0231793 A1 7/2025 Lim et al.
2025/0232130 A1 7/2025 Tao et al.
2025/0232351 A1 7/2025 Tao et al.
2025/0232375 A1 7/2025 Tao et al.
2025/0232376 A1 7/2025 Tao et al.
2025/0232377 A1 7/2025 Tao et al.
2025/0232503 A1 7/2025 Lim et al.
2025/0238536 A1 7/2025 Nikoghossian et al.
2025/0245071 A1 7/2025 Ionescu et al.
2025/0245511 A1 7/2025 D'Agostino et al.

* cited by examiner

100A
Host Platform 120
Feature DB 122
2nd Feature
1st Feature
Monitoring System
124
Software Application 121
Automated Feature Graduation
Account DB 123
User Interface 112
User Device
110

100B
Host Platform 120
Animation Files 126
Animation
Dynamically-Selected Animation
Animation Controller 125
Context
Animation
Registration Data
Software Application 121
Account DB 123
Animation
User Interface 112
110
User Device

Figure 2A:
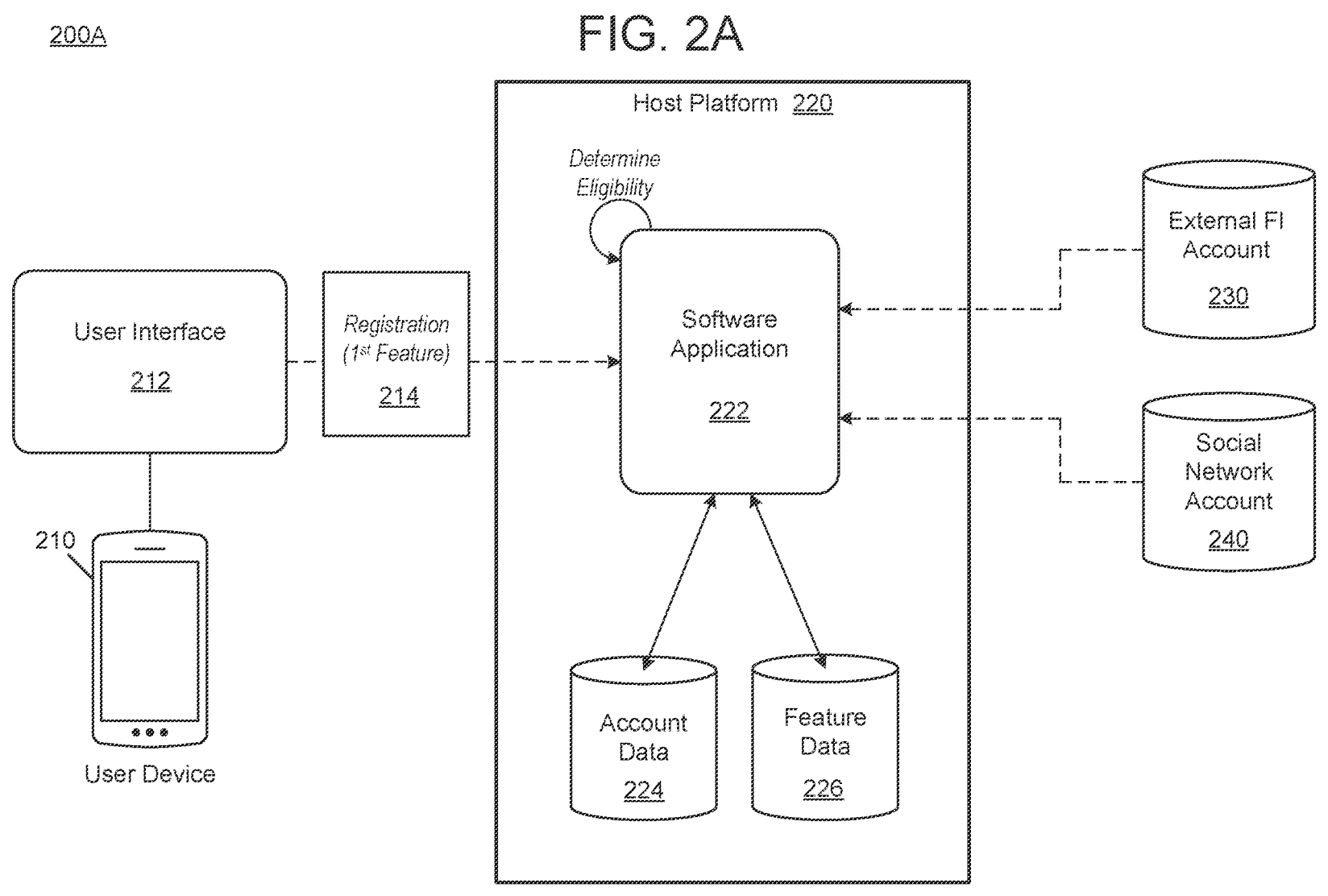

User Interface 212

210

User Device

Registration (1st Feature) 214

Host Platform 220

Determine Eligibility

Software Application 222

Account Data 224

Feature Data 226

External FI Account 230

Social Network Account 240

Figure 2B:
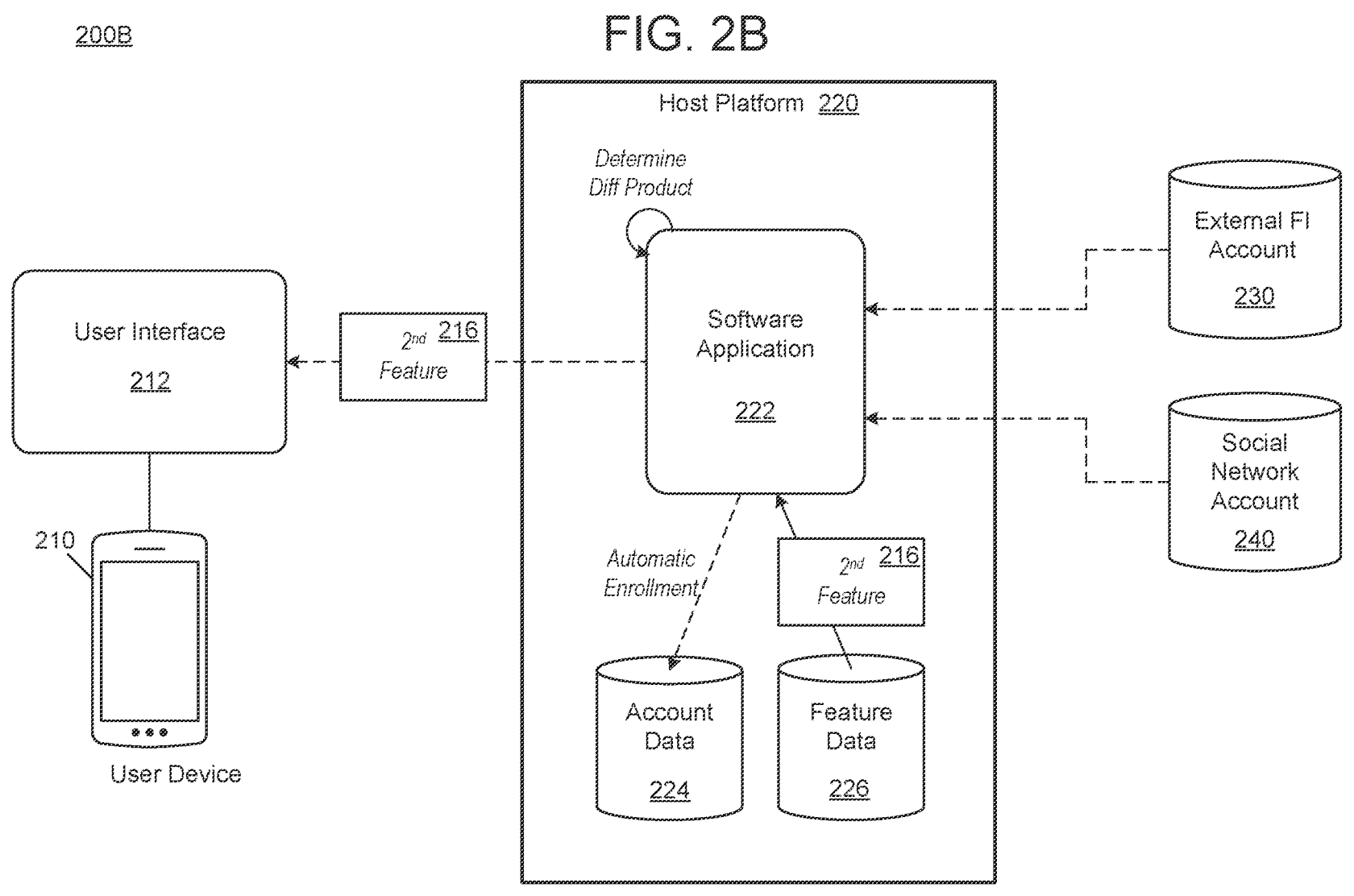

Host Platform 220

Software Application 222

Determine Diff Product

2nd Feature 216

Feature Data 226

Account Data 224

Automatic Enrollment

External FI Account 230

Social Network Account 240

2nd Feature 216

User Interface 212

User Device

300A
User Interface 312
314
316
318
Request
310
User Device
Host Platform 320
Determine Action to Perform
Software Application
322
Retrieve Action Time
Feature Actions
324
Animation Repository
326

300B
Host Platform 320
Select Animation based on Context
Waiting Period Service 400
AI Model 323
Software Application 322
327
Animation File
Animation Repository 326
Feature Actions 324
Play Waiting Period + Animation
User Interface 312
Render
316
318
314
310
User Device 300C
Feature Actions 324
Table 330
332
Actions
Animation Time
Transaction Approval
6 seconds
Vendor Verification Call
9 seconds
Credit Check
4 seconds
Funds Transfer
3 seconds
Install UI Feature
6 seconds
Software Update B
5 seconds
Software Application
322
Determine Waiting Time
Request

420

Trigger Animation
Software Application
322
Waiting Period Service 400
Controller
402
Queue Manager
404
Queue 410
Display ID: GUI_2301
Animation File: UserTalking_1.3
Duration: 7.50 seconds
Time Remaining: 2.33 seconds
412
Display ID: GUI_2303
Animation File: KickingBall_2.2
Duration: 12.00 seconds
Time Remaining: 7.82 seconds
414
Display ID: GUI_2303
Animation File: PlayScrollBar_1.1
Duration: 9.00 seconds
Time Remaining: 9.00 seconds
416

430

Waiting Period Service 400
Queue Manager
404
Queue 410
Display ID: GUI_2303
416
Animation File: PlayScrollBar_1.1
Duration: 9.00 seconds
Time Remaining: 0.00 seconds
432
Controller
402
Terminate
Waiting Period
Software
Application
322
Remove
Animation 500
Waiting Period Service 400
512
Buffer of Time
Queue Manager 404
Queue 410
514
Display ID: GUI_2301
Animation File: UserTalking_1.3
Action Time: 2.20 seconds
Buffer of Time: 3:80 seconds
Time Remaining: 6.00 seconds
Trigger Animation
Software Application 322
Add Pause
Controller 402
Pause Storage 510

Figure 7B:
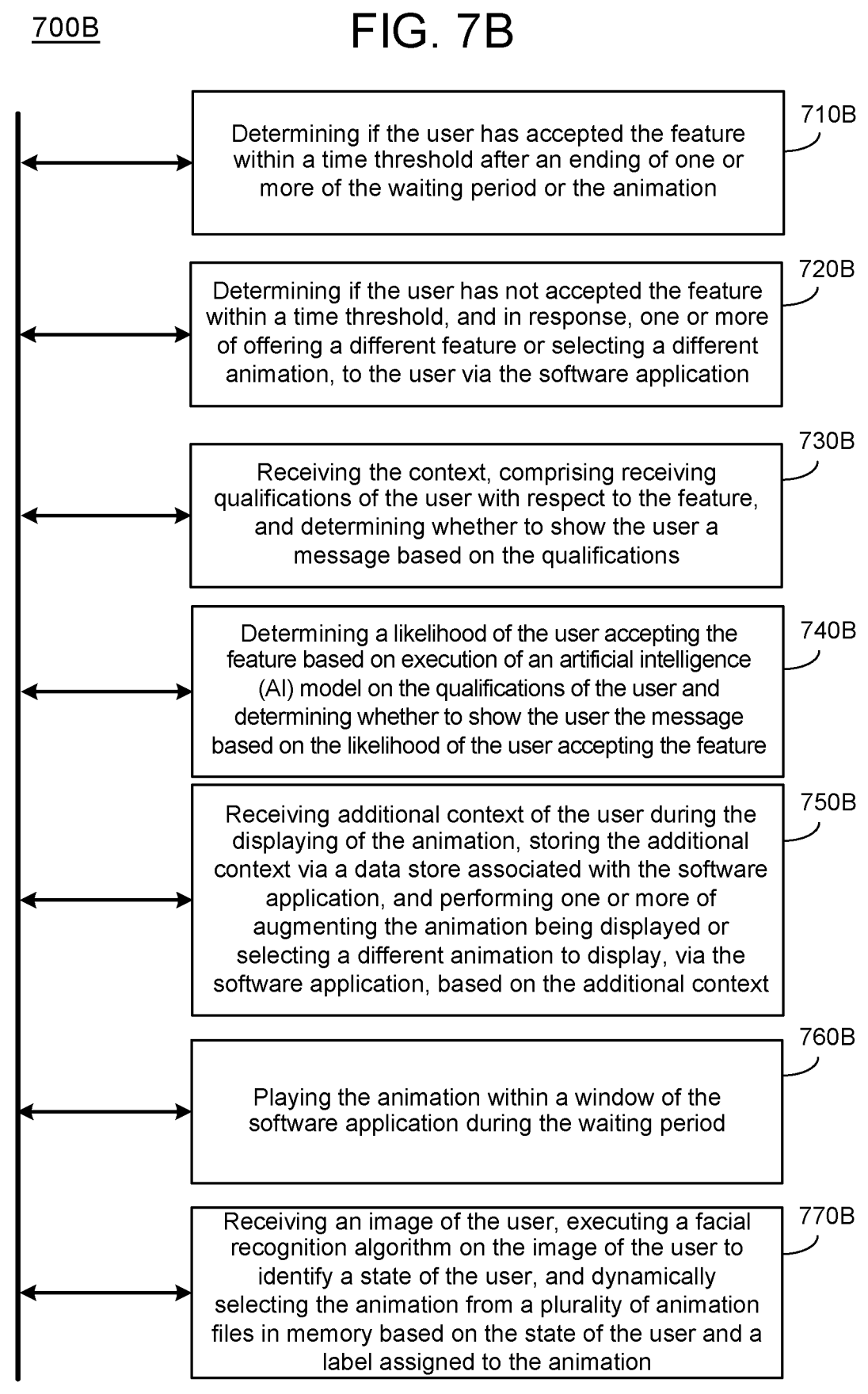

Determining if the user has accepted the feature within a time threshold after an ending of one or more of the waiting period or the animation

710B

Determining if the user has not accepted the feature within a time threshold, and in response, one or more of offering a different feature or selecting a different animation, to the user via the software application

720B

Receiving the context, comprising receiving qualifications of the user with respect to the feature, and determining whether to show the user a message based on the qualifications

730B

Determining a likelihood of the user accepting the feature based on execution of an artificial intelligence (AI) model on the qualifications of the user and determining whether to show the user the message based on the likelihood of the user accepting the feature

740B

Receiving additional context of the user during the displaying of the animation, storing the additional context via a data store associated with the software application, and performing one or more of augmenting the animation being displayed or selecting a different animation to display, via the software application, based on the additional context

750B

Playing the animation within a window of the software application during the waiting period

760B

Receiving an image of the user, executing a facial recognition algorithm on the image of the user to identify a state of the user, and dynamically selecting the animation from a plurality of animation files in memory based on the state of the user and a label assigned to the animation

770B

800A

800B

900

DYNAMIC ANIMATION BASED ON WAITING PERIOD

BACKGROUND

When a customer of a software application applies for a feature through the software application, (e.g., applies for a loan from a financial institution, etc.) the customer typically receives a "yes" or "no" answer. In other words, the customer's application for a feature is either approved or denied. When the customer is denied, the customer must reapply for the feature. This often results in the user having to fill out the application again, resubmit the application, and go through the approval process all over.

SUMMARY

One example embodiment provides an apparatus that may include a memory and a processor coupled to the memory, the processor configured to perform one or more of perform a registration of a user for a first feature by a software application, wherein the registration of the user comprises a receipt of information about the user, determine that the information does not meet a first condition related to a first feature, determine that the information meets a second condition related to a second feature, generate an offer to the user the second feature based on the information, detect acceptance of the second feature, by the software application, and enable the second feature by the software application for the user in response to the acceptance.

Another example embodiment provides a method that includes one or more of registering a user for a first feature by a software application, wherein the registering of the user comprises receiving information about the user, determining that the received information does not meet a first condition related to a first feature, determining that the received information meets a second condition related to a second feature, generating an offer to the user the second feature based on the information, detecting acceptance of the second feature, by the software application, and enabling the second feature by the software application for the user in response to the acceptance.

A further example embodiment provides a computer-readable storage medium comprising instructions stored therein which when executed by a processor cause the processor to perform one or more of registering a user for a first feature by a software application, wherein the registering of the user comprises receiving information about the user, determining that the received information does not meet a first condition related to a first feature, determining that the received information meets a second condition related to a second feature, generating an offer to the user the second feature based on the information, detecting acceptance of the second feature, by the software application, and enabling the second feature by the software application for the user in response to the acceptance.

A further example embodiment provides an apparatus that may include a memory and a processor coupled to the memory, the processor configured to perform one or more of receive context of a user during an inquiry of a feature via a software application, execute a waiting period via the software application, during the waiting period, select an animation to display via the software application based on the context of the user and the feature inquiry, wherein the animation provides contextual data associated with the feature, and the contextual data is based on a determined need of the user, display the animation via the software application during the waiting period, and determine if the user has accepted the feature via the software application.

A further example embodiment provides a method that includes one or more of receiving context of a user during an inquiry of a feature via a software application, executing a waiting period via the software application, during the waiting period, selecting an animation to display via the software application based on the context of the user and the feature inquiry wherein the animation provides contextual data associated with the feature, wherein the contextual data is based on a determined need of the user, displaying the animation via the software application during the waiting period, and determining if the user has accepted the feature via the software application.

A further example embodiment provides a computer-readable storage medium comprising instructions stored therein which when executed by a processor cause the processor to perform one or more of receiving context of a user during an inquiry of a feature via a software application, executing a waiting period via the software application, during the waiting period, selecting an animation to display via the software application based on the context of the user and the feature inquiry wherein the animation provides contextual data associated with the feature, wherein the contextual data is based on a determined need of the user, displaying the animation via the software application during the waiting period, and determining if the user has accepted the feature via the software application.

A further example embodiment provides an apparatus that may include a memory and a processor coupled to the memory, the processor configured to perform one or more of execute a waiting period of time within a software application being accessed by a user, execute an animation via the software application during the waiting period, determine a result of the software application being accessed by the user, determine additional time to add to the waiting period of time based on the result, via the software application, execute the waiting period with the additional time, augment the animation based on the additional time to add to the waiting period, via the software application, and execute the augmented animation via the software application during the additional time.

A further example embodiment provides a method that includes one or more of executing a waiting period of time within a software application being accessed by a user, executing an animation via the software application during the waiting period, determining a result of the software application being accessed by the user, determining additional time to add to the waiting period of time based on the result, via the software application, executing the waiting period with the additional time, augmenting the animation based on the additional time to add to the waiting period, via the software application, and executing the augmented animation via the software application during the additional time.

A further example embodiment provides a computer-readable storage medium comprising instructions stored therein which when executed by a processor cause the processor to perform one or more of executing a waiting period of time within a software application being accessed by a user, executing an animation via the software application during the waiting period, determining a result of the software application being accessed by the user, determining additional time to add to the waiting period of time based on the result, via the software application, executing the waiting period with the additional time, augmenting the animation based on the additional time to add to the waiting period, via the software application, and executing the augmented animation via the software application during the additional time.

BRIEF DESCRIPTION OF THE DRAWINGS

FIGS. 2A-2D are diagrams illustrating a process of activating an alternative feature within the software application, monitoring behavior of the user with the alternative feature within the software application, and dynamically activating another feature according to example embodiments.

FIG. 7B is another flow diagram according to example embodiments.

DETAILED DESCRIPTION

Figure 1A:
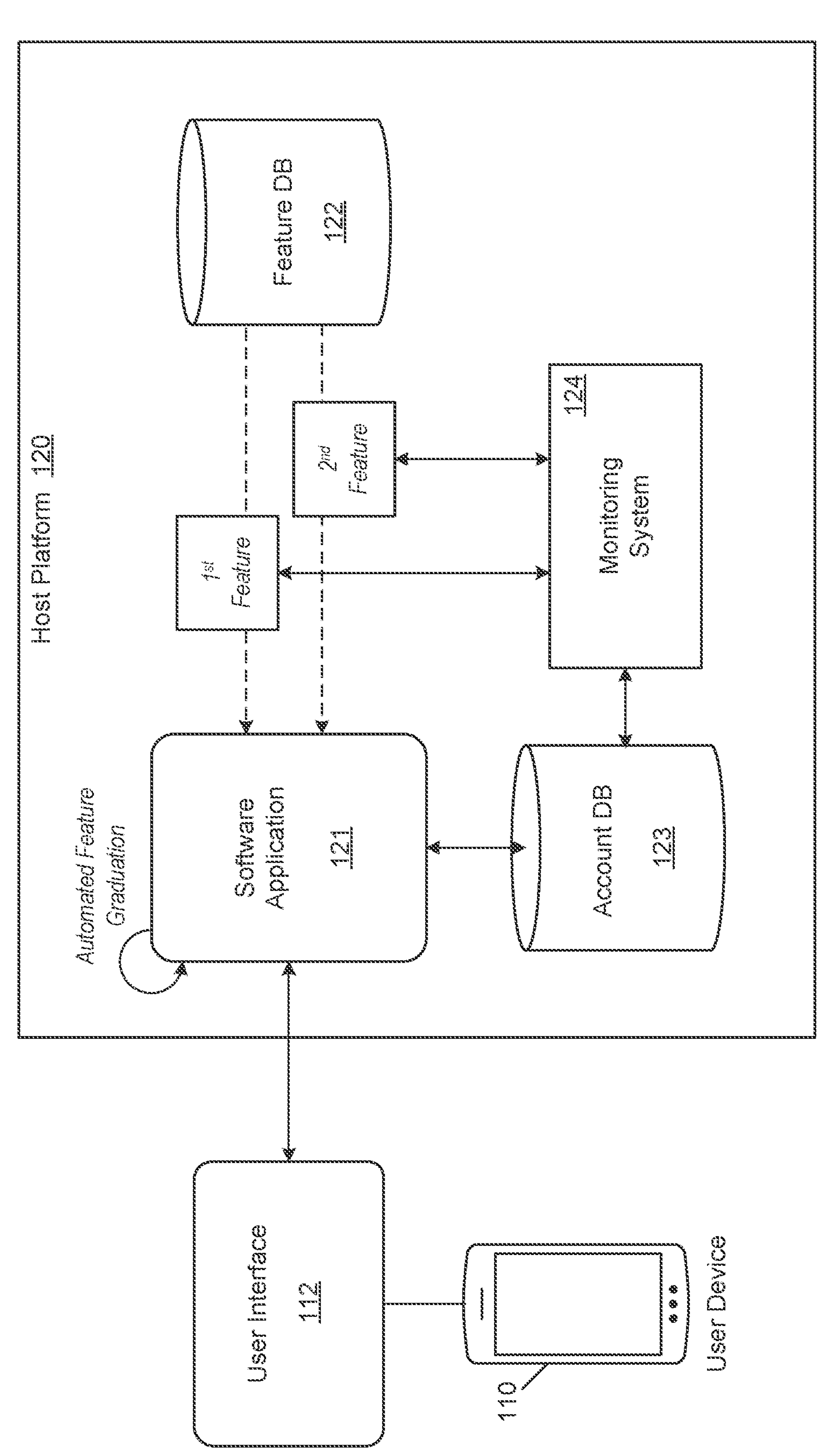
FIGS. 1A and 1B are diagrams illustrating a host platform for activating features and playing animation according to example embodiments.

It is to be understood that although this disclosure includes a detailed description of cloud computing, implementation of the instant solution recited herein is not limited to a cloud computing environment. Rather, embodiments of the instant solution are capable of being implemented in conjunction with any other type of computing environment now known or later developed.

The instant solution may be implemented in conjunction with computing environments involving technology classified under one or more of the artificial intelligence (AI) classifications and/or AI models, known now or later developed. Technological advancements typically build upon the fundamentals of predecessor technologies, such is the case with AI models. An AI classification system describes the stages of AI progression. The first classification is known as "Reactive Machines," followed by present-day AI classification "Limited Memory Machines" (also known as "Artificial Narrow Intelligence"), then progressing to "Theory of Mind" (also known as "Artificial General Intelligence") and reaching the AI classification "Self Aware" (also known as "Artificial Superintelligence"). Present-day Limited Memory Machines are a growing group of AI models built upon the foundation of its predecessor, Reactive Machines. Reactive Machines emulate human responses to stimuli; however, they are limited in their capabilities as they cannot typically learn from prior experience. Once the AI model's learning abilities emerged, its classification was promoted to Limited Memory Machines. In this present-day classification, AI models learn from large volumes of data, detect patterns, solve problems, generate and predict data, and the like, while inheriting all of the capabilities of Reactive Machines. Examples of AI models classified as Limited Memory Machines include, but are not limited to, Chatbots, Virtual Assistants, Machine Learning (ML), Deep Learning (DL), Natural Language Processing (NLP), Generative AI (GenAI) models, and any future AI models that are yet to be developed possessing the characteristics of Limited Memory Machines. Generative AI models are a combination of Limited Memory Machine technologies, incorporating ML and DL, and, in turn, form the foundational building blocks of future AI models. For example, Theory of Mind is the next progression of AI that will be able to perceive, connect, and react by generating appropriate reactions in response to the entity with which the AI model is interacting; all of these capabilities rely on the fundamentals of Generative AI. Furthermore, in an evolution into the Self Aware classification, AI models will be able to understand and evoke emotions in the entities they interact with, as well as possessing their own emotions, beliefs, and needs, all of which rely on Generative AI fundamentals of learning from experiences to generate and draw conclusions about itself and its surroundings. Generative AI models are integral and core to future artificial intelligence models. As described herein, AI models refers to present-day Generative AI models, present-day AI models, as well as future Generative AI models and AI models.

The example embodiments are directed to a platform that can register a user for different features (e.g., products, services, etc.) of a software application. The features may be activated within the software application such as accounts, menus, functions, methods, programs, services, and the like. The software application may be a web-based application, a mobile application, a website, a combination thereof, and the like. The user's actions may be monitored and analyzed to determine whether criteria have been met for automatically activating a feature within the software application.

The criteria for activating a feature may be simple criteria such as achieving a particular balance in a bank account. As another example, the criteria for activating a feature may be complex and may require conditions to be met for both the user and the account such as the user increasing a credit score and the account reaching a particular bank account balance. Examples of user actions include actions performed by a user with respect to a website, a payment account, a user interface, or the like. Thus, the actions may refer to actions that are performed by the user within the software application in some way. As another example, the system described herein may also, or instead, monitor accounts that are managed by other software applications and websites such as social media accounts, financial services accounts, banking accounts, and the like. As another example, performance of accounts may also, or instead, be monitored and analyzed to determine if criteria have been met for automatically activating a feature within the software application. As an example, changes to a user's career, education, or the like, which are identified from a social media account may be used to automatically activate a feature within the software application. As another example, the user's behavior with an external financial account may be used to automatically activate a feature within the software application.

Activation of features may include installation of new software and/or upgrades to existing software. For example, new buttons, new menus, new functions, new methods, new user interface elements, and the like, may appear within the software application as a result of the activation of the feature. Furthermore, prior to and/or during activation of a feature, the software application may perform checks and validations on the user using local sources and/or external sources to ensure that the user meets or continues to meet any criteria associated with the application features. During this time, the software application may place calls to vendors that require a few seconds (e.g., 2-9 seconds, etc.). As another example, the software application may query data stores and databases, may generate and send messages, may capture sensor data, and the like.

To keep a user's attention on the software application while the user is waiting, the example embodiments also provide a dynamic animation process. For example, when the vendor calls are placed, the host platform may play an animation within a window of the software application to maintain the user's attention on the screen of the device. The animation may be played at other times as well. For example, anytime there is a waiting period for any type of function, installation, question, call, etc., an animation may be played. Some functions can be performed almost instantaneously. Therefore, in some embodiments, the software application may dynamically add additional time to a waiting period within the software application to create a sense of trust with the user (e.g., the extra time assures the user that the software application is working with their data on the backend, etc.)

The animation that is played during the waiting period may be dynamically selected based on context associated with the user. For example, the animation may be selected based on a function or a check to be performed by the software application. As another example, the animation may be selected based on context associated with the user. The context may be taken from the user's registration information, browsing history, or the like. For example, if the software application determines there will be multiple checks as a result of the user's application for a feature, the software application may determine a time it takes for such multipole checks and select an animation based on the determined amount of time it takes. As an example, the software application may select an animation that is the same amount of time or slightly shorter in time than the duration of the waiting period.

Building strong customer relationships requires being attentive to the customer's questions, goals, and progress. Following up in a timely manner, adding value, and resolving the customers' questions and needs are crucial to building long-lasting trust and increasing customer satisfaction and retention. Proactively engaging customers with information videos, personalized chats, responses from inquiries, resolutions to open issues, and progress against target goals, can all be emphasized with the addition of animation that holds a customer's attention more than a home screen or other static page. Additionally, personalized interactions and thoughtful content help avoid being generic and keep customers engaged.

Figure 1B:
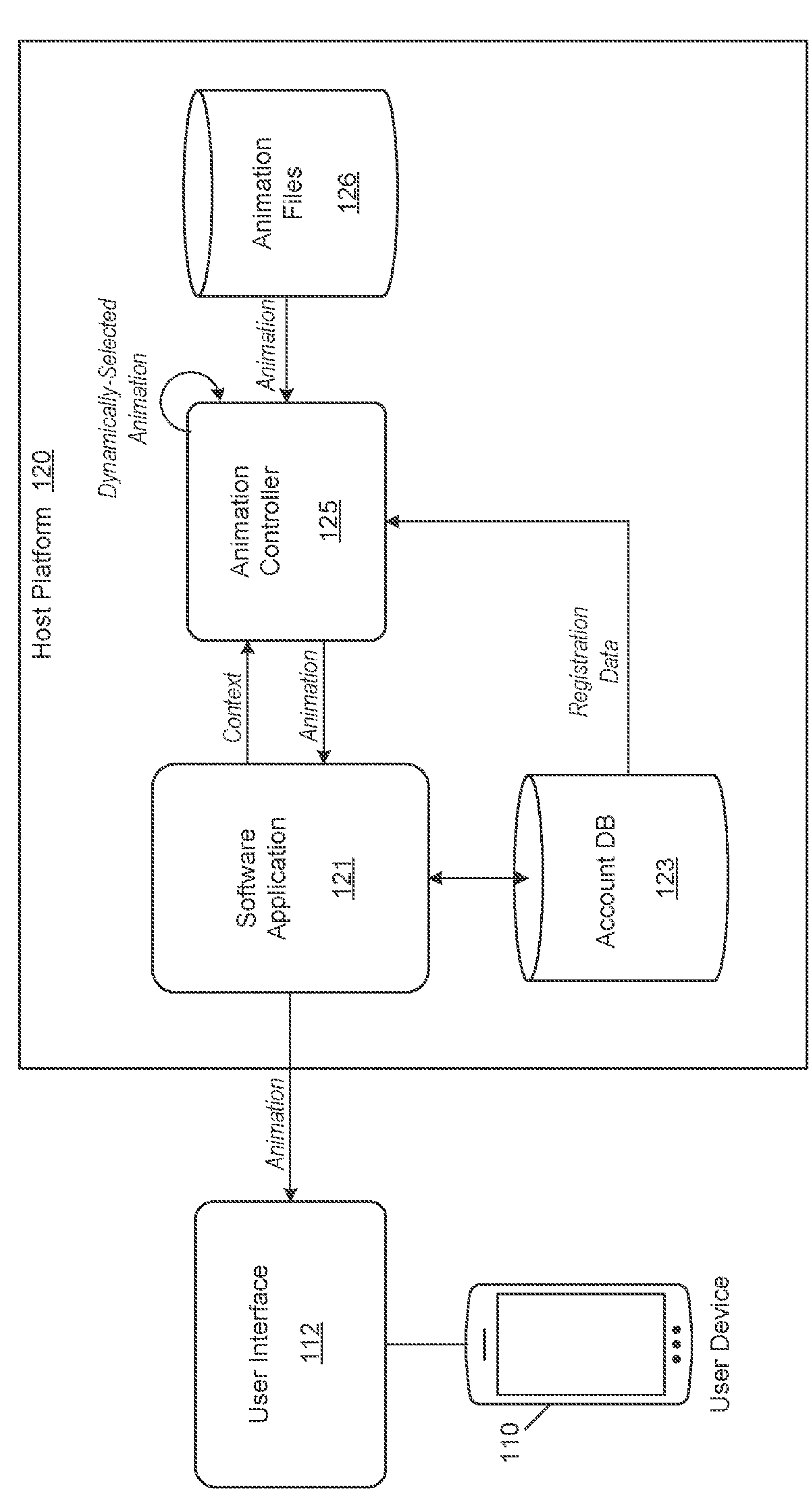

FIGS. 1A and 1B illustrate a host platform 120 that hosts a software application 121 that has logic for dynamically activating features within the software application 121, for example, based on context of a user. FIG. 1A illustrates a process 100A of activating a feature within a software application, and FIG. 1B illustrates a process 100B of playing an animation on a user interface of the software application while activating the feature. As an example, the features may be services, products, or other logic that includes source code, user interface content, functionality, and the like, which may be stored in a feature database 122. Furthermore, the software application 121 may also perform checks and validations prior to activating such features. The software application 121 may cause a waiting period to occur within the software application 121 while the validations and other functions are performed. During the waiting period, the software application 121 may play an animation.

In the example of FIG. 1A, a user may access a user interface 112 of the software application 121 via a user device 110 and submit a registration request for a first feature. Here, the registration request is submitted from the user interface 112 on the user device 110 to the software application 121 hosted on the host platform 120. In response to receiving the registration request, the software application 121 may compare the user's qualifications from the registration and the user's account data in the account database 123 and determine that the user is not eligible yet for the first feature. Instead, the software application 121 may decide to offer the user an alternative feature (e.g., second feature, etc.) The alternative feature may have less stringent requirements, for example, the alternative feature may require a lower account balance, a lower credit score, a shorter history with the organization, etc. than in comparison to the first feature that makes the alternative feature available for the user right now.

In this example, the software application 121 may decide to offer the second feature in response to receiving the registration request for the first feature based on the context of the user. For example, the software application 121 may access user data stored at the account database 123, user data in the registration request submitted from the user device 110, user data from an external data source such as a social network service, an external financial account, or the like. Here, the software application 121 may display a notification message on the user interface 112 of the user device 110 which notifies the user of the availability of the second feature as an alternative to the first feature. The user may accept the second feature by pressing a command on the user interface 112, or the like.

In response to selecting the second feature, an identifier of the user and the second feature may be stored within a monitoring system 124. The monitoring system 124 may monitor usage of the second feature by the user over time. The monitoring system 124 may also monitor other attributes of the user such as account balance, credit score, credit history, bank statements, and the like.

According to various embodiments, the monitoring system 124 may also be configured to automatically activate (or automatically offer) the first feature when the user has achieved a particular condition with respect to the second feature, the first feature, or some other factor such as account balance, credit score, and the like. Here, the monitoring system 124 may be configured with thresholds that dictate when to trigger activation of the first feature.

For example, a user with $7,000 in their savings account and a credit score of 645 may be offered the second feature. In this case, the monitoring system 124 may be configured with thresholds which dictate when the user should be offered the first feature by the software application 121. For example, the software application 121 may configure the monitoring system 124 to automatically offer the user the first feature when the user's account balance is at least $25,000, and the user has a credit score of 720. For example, the offer may be displayed as a button or other graphical user interface element on the user interface 112 output by the software application 121 on the user device 110.

The user may click on the button via the user interface 112. In response, the software application 121 may automatically enroll the user in the first feature. For example, the software application 121 may display new features available to the user via the user interface 112. The new features may include new functionality with new buttons and/or commands that are capable of being selected via the user interface 112. As another example, the new features may include new logic, methods, functions, etc. which are added to the source code of the software application 121 via a software update, etc.

According to various embodiments, the software application 121 may select an animation to play during the waiting period as shown in the example of FIG. 1B. According to various embodiments, an animation that is played during a waiting period on the user interface 112 of the user device 110 may be selected "dynamically" by the animation controller 125 from an animation database 126 based on context associated with the user such as a new feature to be activated within the user's device (software application), an external check to be performed, a message to be transmitted, an application programming interface (API) call to be sent, user data from their registration, user account data, or the like. Here, the host platform 120 may hold the user's registration information in an account database 123 where the registration information can be accessed at a later time.

In the example embodiments, a "feature" may refer to a service or product such as a new account that is opened and which is managed by the software application 121. Other examples of services and products include new payment cards, new investment vehicles, new software functions, new user interface commands, new menus on the user interface, new graphical elements on the user interface, and the like. The activation of a feature may require source code to be updated or otherwise added to the software application 121. Also, the activation of a feature may require the software application 121 to be restarted in order to ensure the updated code takes effect. The restarting of the code may be performed by a controller or other managing component of the host platform 120.

For example, to activate a new credit account within a user's profile within the software application 121, the software application 121 may install or otherwise update new features on the user interface such as new menus, new user interface commands, new functionality, new pages, and the like. Here, the updates may change both the content that is displayed on the user interface and the functionality that the user can perform via the user interface. For example, the user may have access to different pages of the software application as a result of the activation of a new feature. As another example, the user may have access to different APIs, methods, and the like, as a result of the activation of a new feature.

Figure 2C:
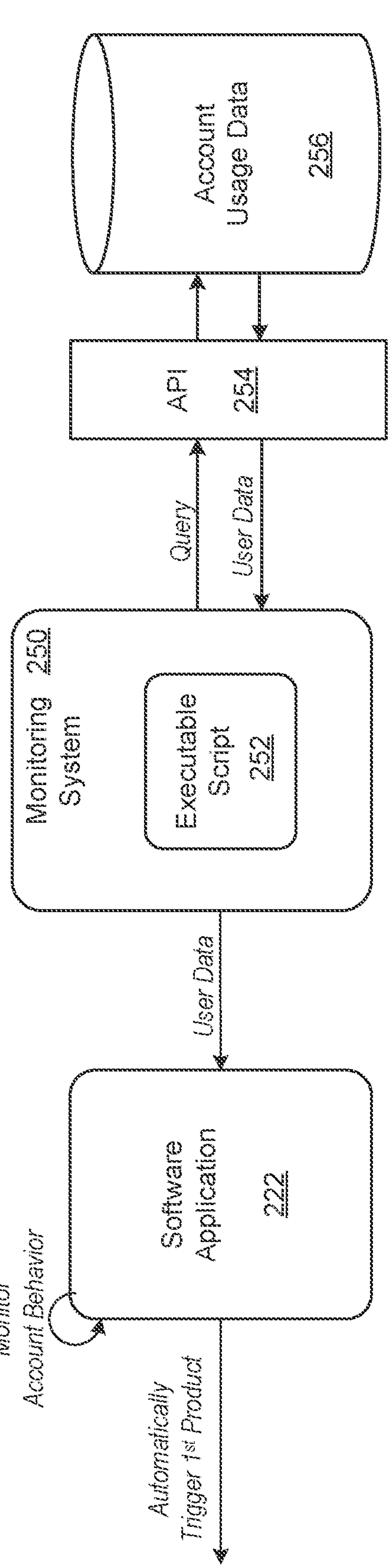

FIGS. 2A-2D are diagrams illustrating a process of activating an alternative feature within the software application, monitoring behavior of the user as the user uses the alternative feature within the software application, and dynamically activating another feature according to example embodiments. For example, FIG. 2A illustrates a process 200A of determining the eligibility of a user with respect to a registration request 214 for a first feature submitted from a user interface 212 of a user device 210 to a software application 222 hosted by a host platform 220. Here, the user device 210 may be connected to the host platform 220 via a network such as the Internet. The user device 210 may be a mobile device, laptop, desktop computer, tablet, smart wearable, appliance, and the like. The host platform 220 may be a cloud platform, a web server, an on-premise server, and the like.

In response to receiving the registration request 214 from the user device 210, the software application 222 may execute one or more of an authentication process, a verification process, a validation process, and the like, with respect to data provided by the user within the registration request 214. Here, the software application 222 may transmit a message or initiate a call to a local system, an external system, or the like.

As an example, the software application 222 may access data within an account data store 224 to identify if the user has met any requirements with their financial accounts, account balances, account history, and the like. As another example, the software application 222 may access feature data within a feature data store 226 to identify if the user has met any requirements that are necessary for activating a feature or features. As another example, the software application 222 may access external data of the user from an external data source 230 and an external data source 240. The external data sources 230 and 240 may include social network services, job application services, resume building services, financial accounts hosted at other institutions, credit score providers, and the like. In some embodiments, an application programming interface (API) invocation may be transmitted from the software application 222 to an API of the external data source to execute and perform the query.

FIG. 2B illustrates a process 200B of determining whether to offer the user an alternative feature (i.e., a second feature) in response to a request for the first feature. The second feature is different from the first feature and may have less stringent requirements. For example, the user may not qualify for the first feature due to their account balance being below a predetermined threshold. However, the software application 222 may determine that the user qualifies for a different feature (second feature) based on the same account balance.

For example, the software application 222 may retrieve a second feature 216 from the feature data store 226 of the host platform 220 and display a notification message on the user interface 212 of the user device 210. Here, the user may click on a button or otherwise input a command via the user interface 212 which approves the activation of the second feature 216. In response, the software application 222 may update account data of the user within the account data store 224 to include the second feature. Furthermore, the software application 222 may install or otherwise add the new feature to the software application 222. The new feature may require new user interface elements, functionality, source code logic, etc. to be added to the software application 222 via a software update or other activation process.

FIG. 2C illustrates a process 200C of monitoring user behavior after the activation of the second feature 216, shown in FIG. 2B, within the software application 222. Here, a monitoring system 250 may include an executable script 252 that is configured to query account data and/or other data of the user on a periodic basis to retrieve user data such as account balance, credit history, credit score, transaction history, feature usage history, and the like, from an account usage data store 256. The query may be executed via an API 254 of the account usage data store 256 and may require an API query to be generated and submitted from the monitoring system 250 in order to retrieve the user data from the account usage data store 256.

According to various embodiments, the executable script 252 may include instructions which identify when to retrieve data from the account usage data store 256, where to retrieve the data (e.g., data address within the database, etc.), the type of analysis to perform on the data, and the like. The analysis may include comparing the retrieved data to threshold values that can be used to determine if the user's qualifications have improved. For example, the analysis may determine that the user has increased their credit score, increased their account balance, etc. associated with the registration request 214, shown in FIG. 2A, of the first feature. In response, the software application 222 may activate the first feature.

Figure 2D:
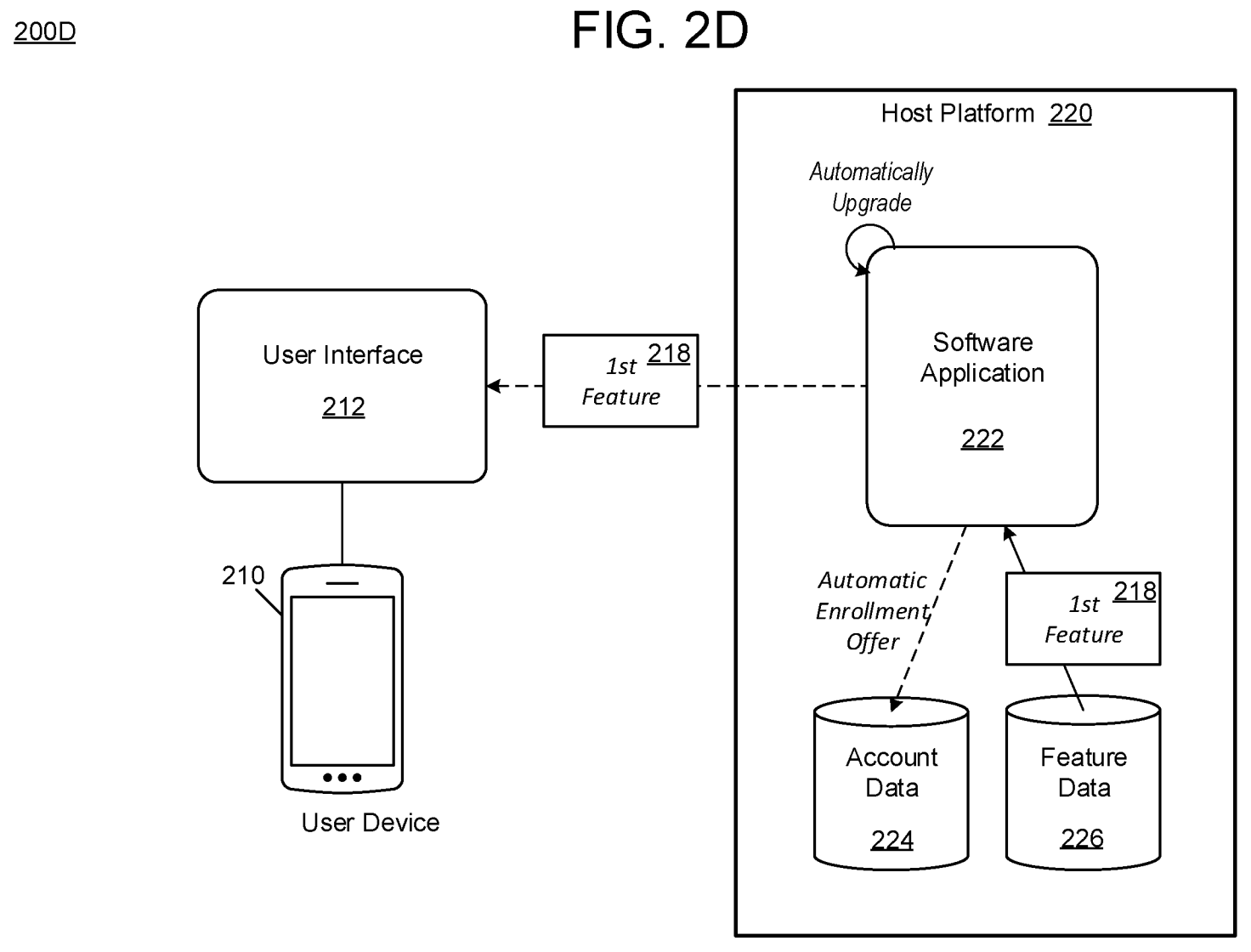

For example, FIG. 2D illustrates a process 200D of activating a first feature 218 within the software application 222 for the user based on the monitoring performed in the process 200C of FIG. 2C. Here, the software application 222 may detect that the user has graduated from the second feature 216, shown in FIG. 2B, to the first feature 218 based on the behavior of the user analyzed by the monitoring system 250, shown in FIG. 2C. Here, the software application 222 may automatically activate the new feature. As another example, the software application may ask the user if they would like for the feature to be activated. For example, the software application 222 may display a message on the user interface 212 with a request to accept activation of the new feature. The user may accept the activation of the new feature by pressing a button on the user interface 212, or the like.

To activate the first feature 218, for example, the software application 222 may retrieve the first feature 218 from the feature data store 226 and add the first feature 218 to the software application 222 for the user. The user may then use the first feature 218, for example, via the user interface 212, and by other means such as by a payment card, digital wallet, etc. To add the first feature 218 may require a software update, etc. Accordingly, the software application 222 may maintain a user's request to add a first feature to their account within the software application 222 while the user is offered an alternative feature. The software application 222 can maintain the user's request for the first feature 218 and monitor the user's activity with the second feature 216. Upon determination of a condition associated with the first feature 218 (such as a credit score, account balance, etc.) being achieved with the second feature 216 activated, the software application 222 may automatically switch to the first feature 218 and install the first feature 218. Here, the software application 222 may simultaneously remove the second feature 216, but embodiments are not limited thereto.

As described herein, when a new customer joins a bank, they may not be aware of the features for which they qualify. Some premium features require more stringent qualifications such as high credit scores, minimum deposit amounts, or a banking history demonstrating certain deposit frequencies and amounts, as well as a minimum account balance for a duration of time. In these situations, prospective customers can be offered additional features for which they meet the qualifications. If a customer is not qualified for a particular feature, the bank can preserve the customer's initial feature request and data in the event they qualify at a future time. Then, as the customer conducts business with the bank, if they meet the requirements for the original feature, they can receive an offer for the feature along with a simplified acceptance to be enrolled into the feature. This instant solution uses information received from a user during feature registration to offer a second feature. The instant solution then monitors usage of the second feature to detect when the user meets the conditions for the first feature. The first feature is then displayed in the user interface to the user along with an acceptance option to allow the user to accept the first feature.

Figure 3A:
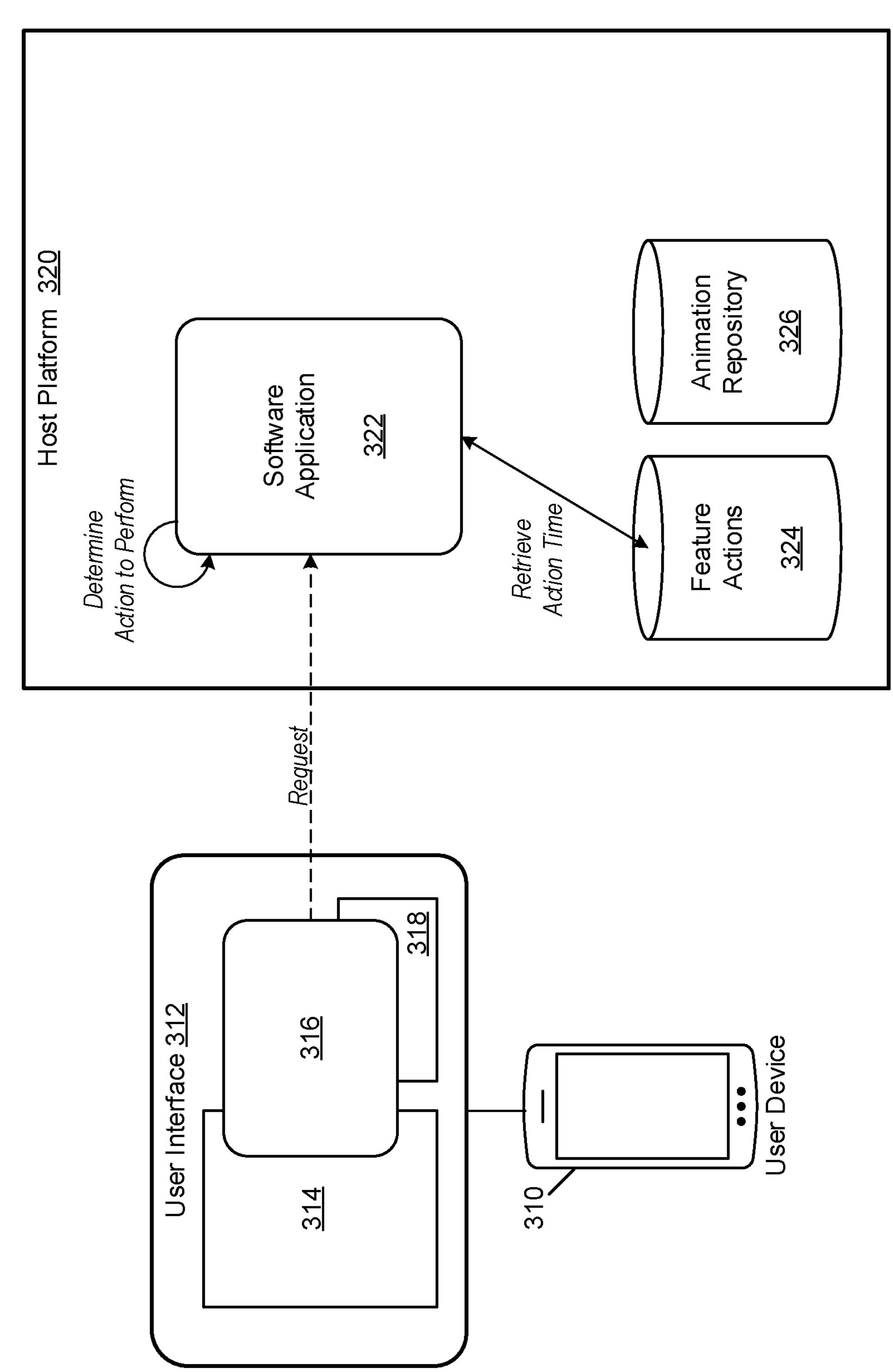
FIGS. 3A-3C are diagrams illustrating processes of dynamically selecting an animation to play during a waiting period according to example embodiments.
Figure 3B:
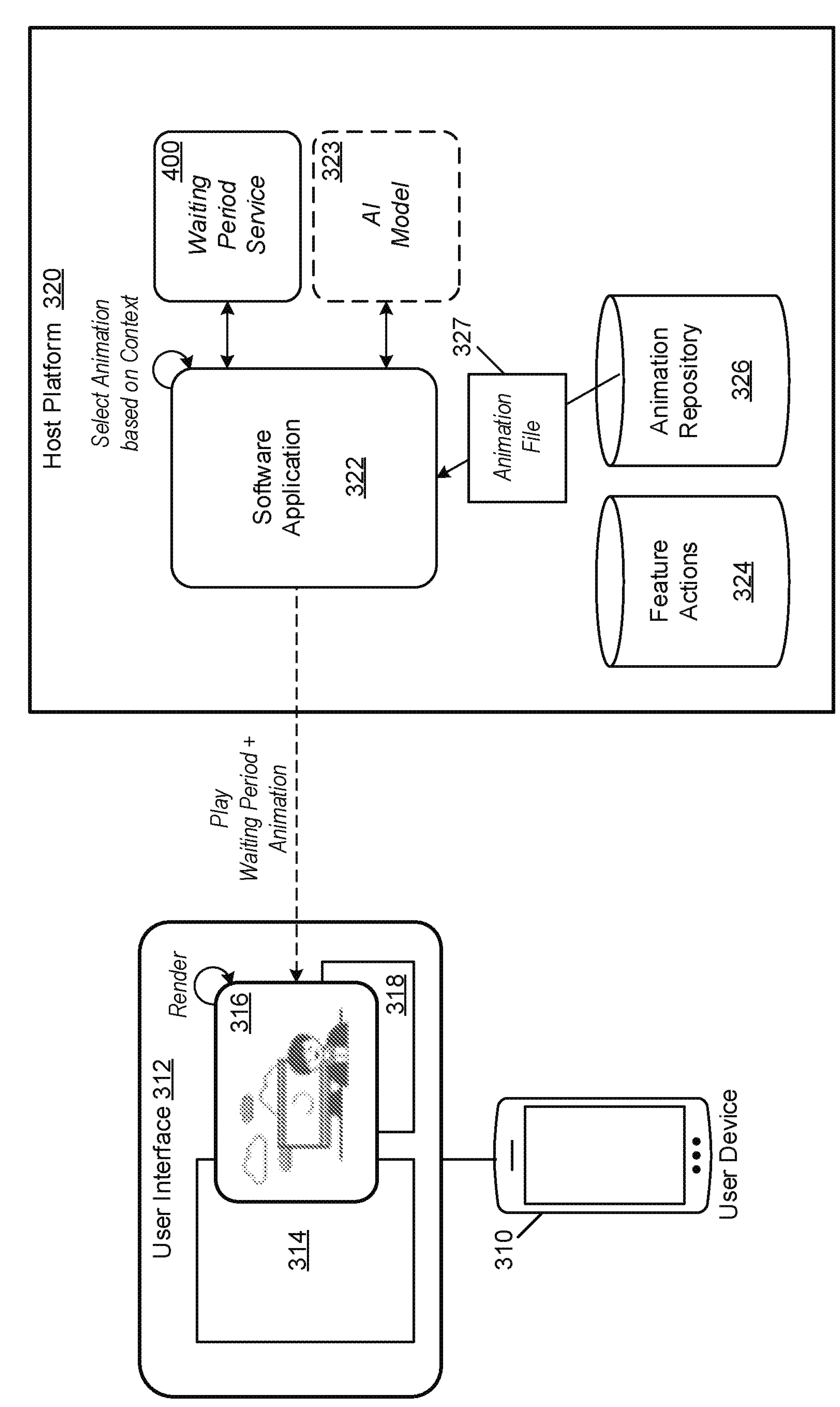
Figure 3C:
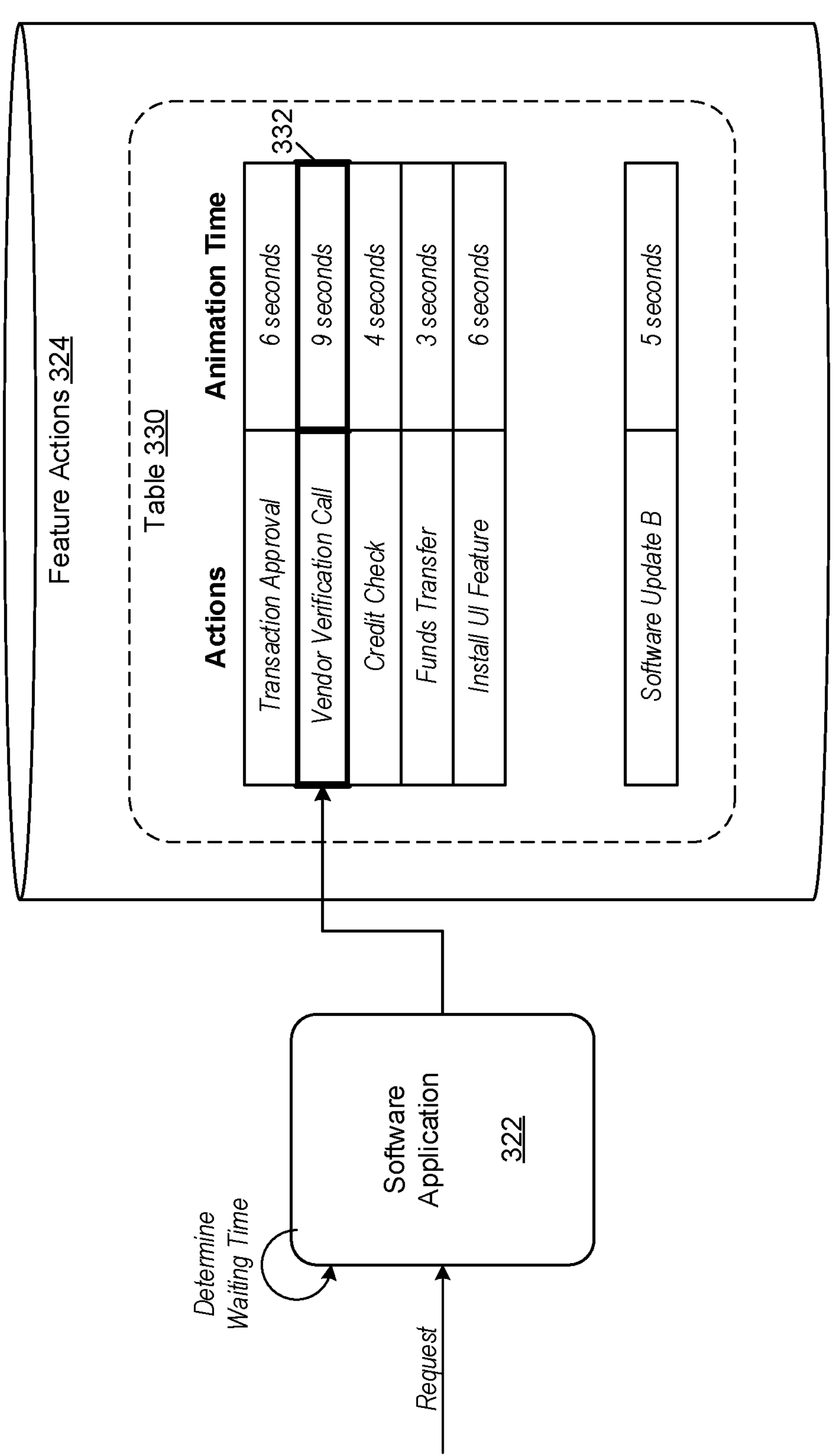

FIGS. 3A-3C illustrate processes of dynamically selecting an animation to play during a waiting period according to example embodiments. According to various embodiments, the software application described herein may perform checks and other validations on a user and the user's data, for example, when activating features of the software application. During the waiting period, the software application may display an animation that is designed to engage the user and notify the user what the system is currently doing.

For example, FIG. 3A illustrates a process 300A of receiving a request by a software application and determining a waiting period according to example embodiments. Referring to FIG. 3A, a user may open a user interface 312 of a software application 322 on a user device 310. The software application 322 is hosted by a host platform 320 that is connected to the user device 310 over a network. With the user interface 312 open, the user may open various windows of content including a window 314, a window 316, and a window 318.

While using window 316, the window 316 sends a request to the software application 322. In response, the software application 322 may determine an action to perform for the window 316 and to execute a waiting period within the window 316 while the action is being performed. Here, the software application 322 may retrieve the action to perform from a mapping of actions to waiting period times stored in a feature actions data store 324 to identify how long (i.e., a duration) of a waiting period to execute for the window 316. In addition to identifying a waiting period, the system may also identify an animation to play.

For example, FIG. 3B illustrates a process 300B of selecting an animation file 327 to play during a waiting period within the window 316 of the software application that is open on the user interface 312 on the user device 310. In this example, the software application 322 determines a waiting period for the window 316 and initiates a waiting period service 400. The initiation of the waiting period service may be sent from the software application 322 to the waiting period service 400 with an identifier of the window 316, the duration of the waiting period, an amount of time left on the waiting period, and the like. In this example, the waiting period service 400 may start the waiting period and stop the waiting period using a timing function, etc.

In addition, the software application 322 may dynamically select an animation file 327 to play from an animation repository 326, based on the contextual data of the user, and display or otherwise play the animation file 327 on the window 316 of the user interface 312 during the waiting period. The animation file 327 may be selected based on contextual data associated with the user such as the user's application for a feature, the action to be performed, and the like.

Furthermore, the software application 322 may execute an artificial intelligence (AI) model 323 on user data to determine the type of data to show the user during the waiting period. For example, the AI model 323 may receive user data such as the user's application for the feature and determine whether or not the user is likely to accept the feature being offered. If so, the AI model 323 may generate a message that is sent to the software application 322 and output on the user interface 312 by the software application 322. The message may be output within the window 316 at the same time as the animation is being played within the window 316.

To determine the duration of the waiting period executed by the waiting period service 400, the software application may map actions to perform during the waiting period to duration values. FIG. 3C illustrates a process 300C of the software application 322 mapping an action to be performed within the window 316, shown in FIG. 3B, to a duration of time via the feature actions data store 324. The feature actions data store includes a lookup table 330 with a mapping stored therein, which can be used to identify how long of a waiting period to execute for a particular action. For example, the request from the user interface 312 may identify a type of verification to perform for the user. In response, the software application 322 may determine an amount of time necessary for the waiting period based on an entry 332 within the lookup table 330 that corresponds to the type of verification to perform that is identified in the request.

Figure 4A:
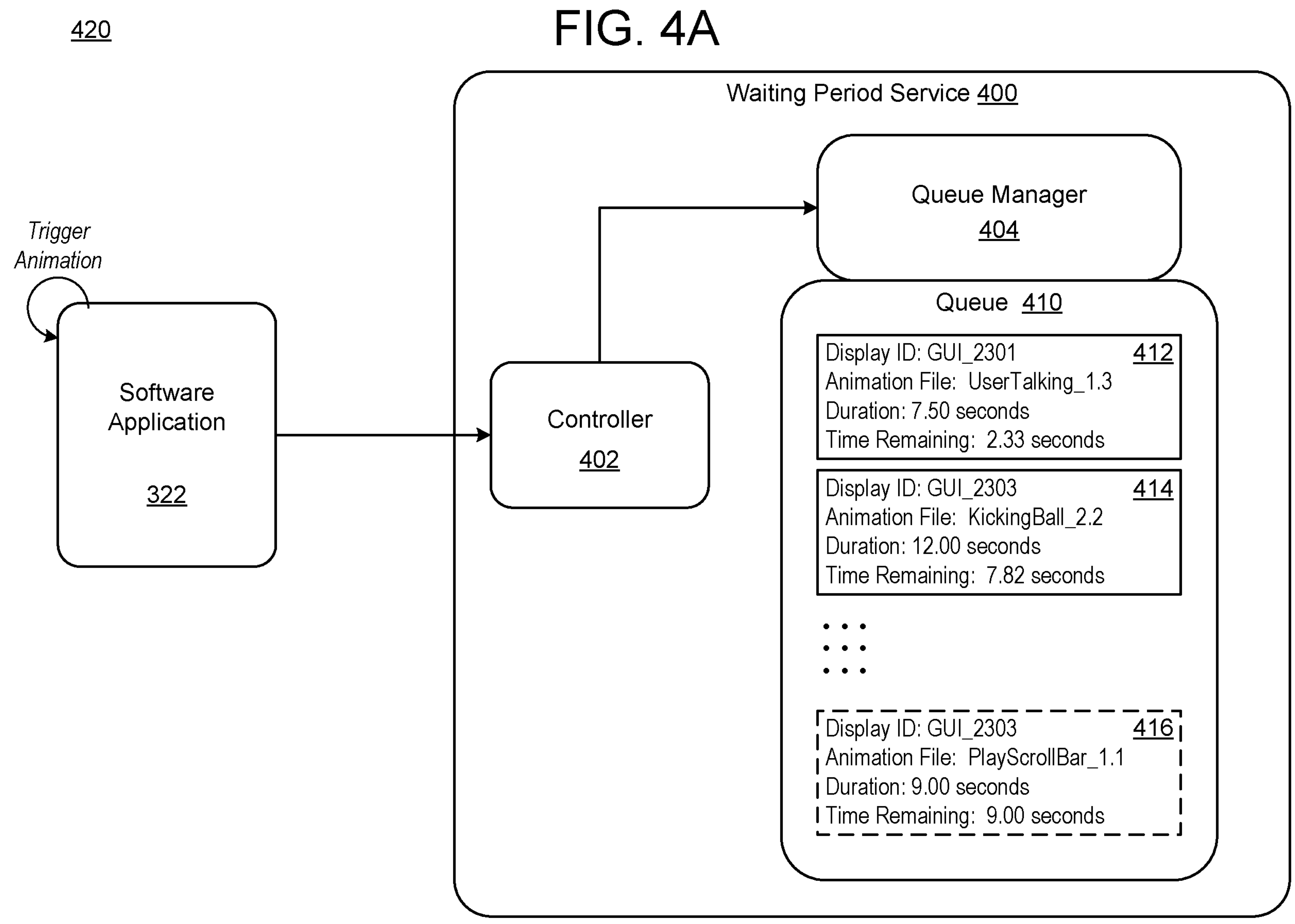
FIGS. 4A-4B are diagrams illustrating a process of managing a waiting period and an animation according to example embodiments.
Figure 4B:
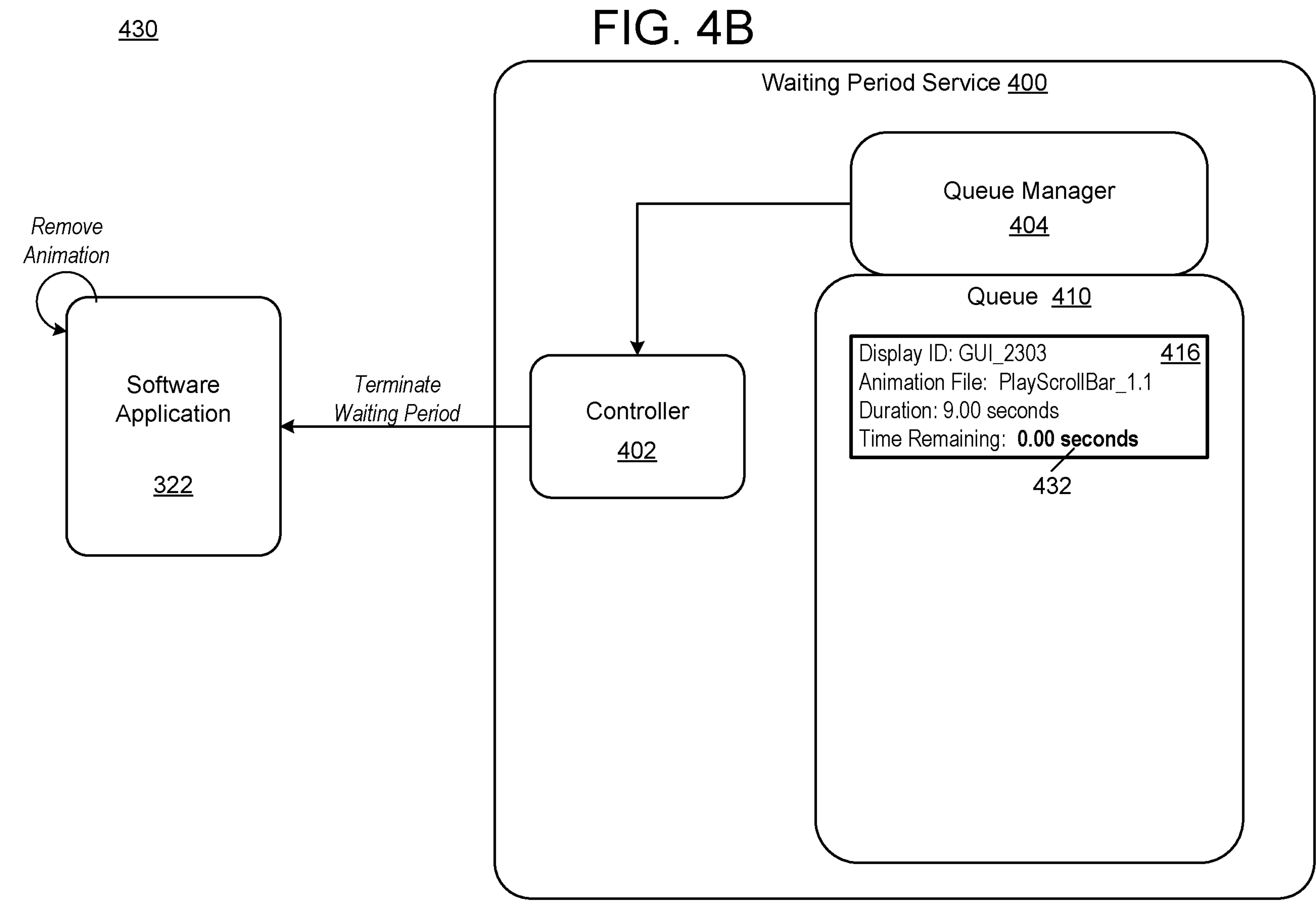

FIGS. 4A-4B illustrate a process of managing a waiting period and an animation according to example embodiments. For example, FIG. 4A illustrates a process 420 of the waiting period service 400 adding a new waiting period to a queue 410 of the waiting period service 400. Here, the waiting period service 400 includes a controller 402 which receives a request from the software application 322 to execute a waiting period. The request may include attributes associated with the waiting period such as an identifier of the software application 322, an identifier of the window where the waiting period is going to be executed (if necessary), a duration of the waiting period, an identifier of an animation file to be played, and the like.

The controller 402 may send the data associated with the waiting period from the software application 322 to a queue manager 404 which adds a new entry 416 to the queue 410. Here, the queue manager 404 inserts the new entry 416 into the queue 410 at the end of the queue 410 based on the order it is received. Therefore, the new entry 416 is inserted after previous entries 412 and 414 which are already in the queue 410. Each entry may include a timer function in some manner such as a countdown clock, time-to-live job, timer, or the like, which can expire at the end of the waiting period and trigger a termination of the waiting period and the animation being played during the waiting period.

Context may refer to user information, preferences, behaviors, and current interactions within the application. It may be the user's current transaction details, profile preferences, or interaction history. Based on the received context, the software application dynamically chooses appropriate animations to display. For instance, if a user is making a funds transfer, the solution might select animations related to fund transfers, perhaps visual representations of money moving from one account to another, or related branding elements. While the user awaits the completion of a process, such as transaction approval, the selected animations are displayed in a designated window of the user interface. This keeps the user engaged and informed, reducing perceived waiting time and improving user experience. The animations can be used to convey information regarding the ongoing process or to reinforce the bank's branding and promotional messages subtly. For example, while processing a loan, the animation may illustrate the steps involved, enhancing user understanding and managing expectations. Dynamic selection of animations based on user context enables a personalized user experience.

FIG. 4B illustrates a process 430 of terminating a waiting period and a corresponding animation associated with the waiting period. In this example, the queue manager 404 determines a counter value 432 within the queued entry of the waiting period of the window 316 in the queue 410 has ended. In response, the queue manager 404 sends a termination request to the controller 402 which forwards the termination request to the software application 322 causing the software application 322 to terminate the waiting period and the animation.

Figure 5A:
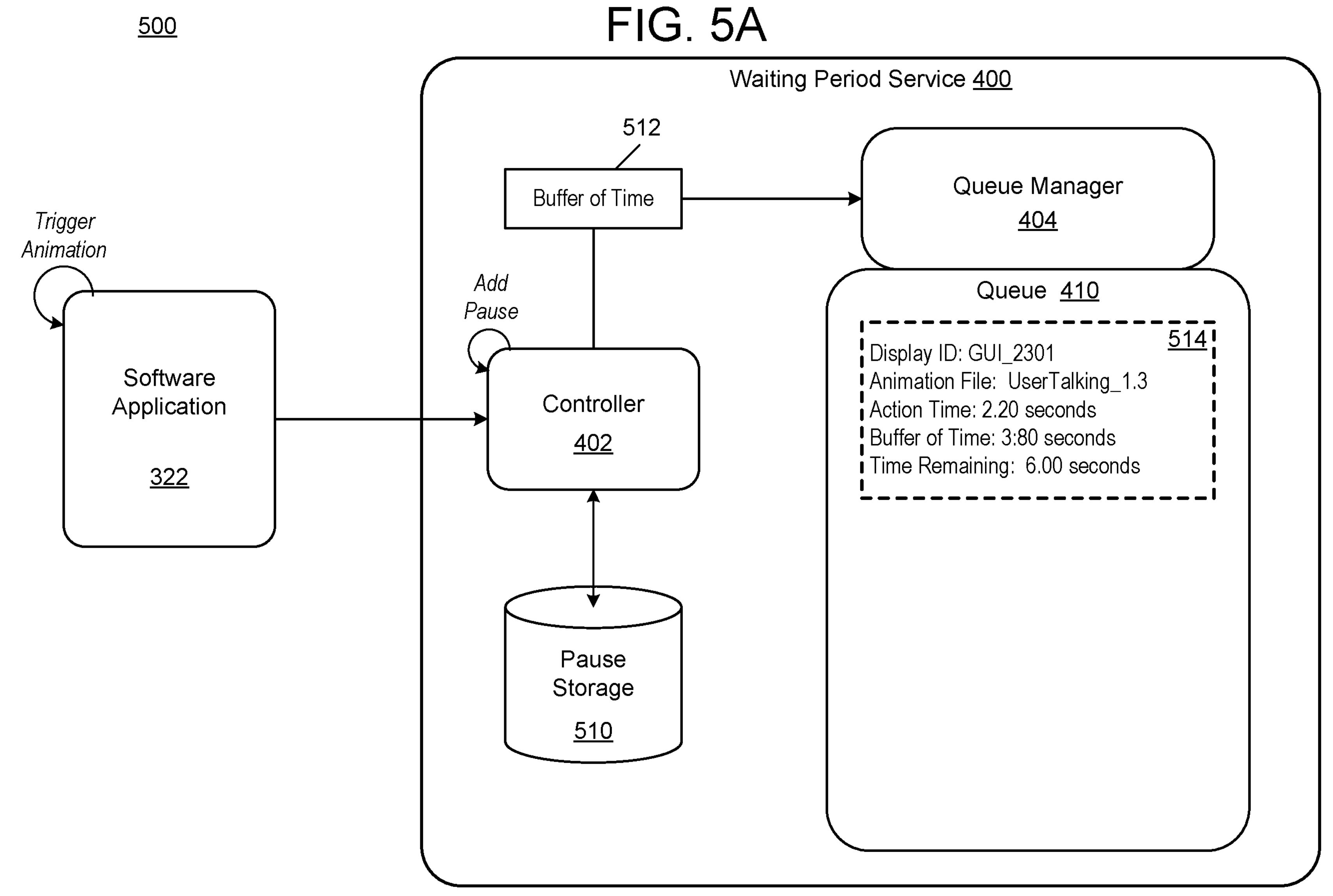
FIGS. 5A-5B are diagrams illustrating a process of adding additional time to a waiting period according to example embodiments.
Figure 5B:
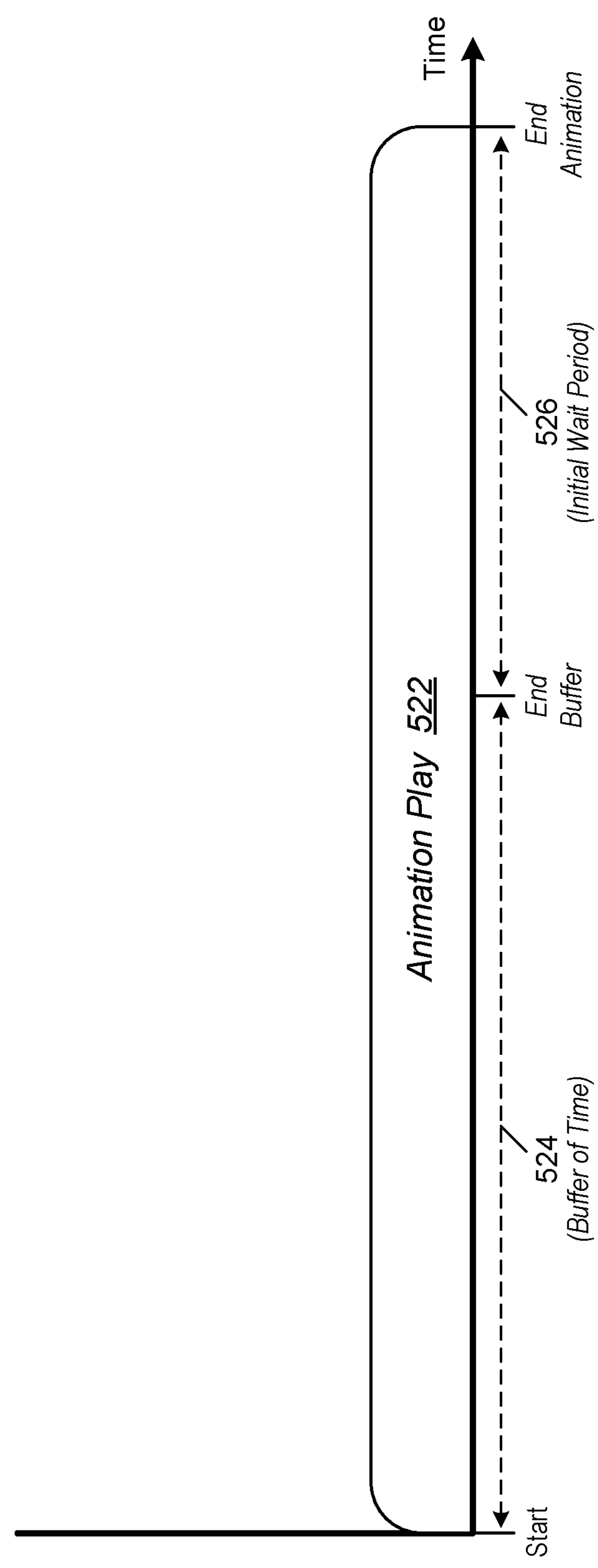

FIGS. 5A-5B illustrate a process of adding additional time to a waiting period according to example embodiments. In some embodiments, the duration of the waiting period is brief which can cause the user to feel as if there was no processing performed. The example embodiments can add time to a waiting period and select an animation that plays during both the waiting period and the added time. For example, customers are often entering sensitive information such as credit card numbers, passwords, social security numbers, keys, and the like. The example embodiments can add time to a waiting period to ensure that each waiting period has a minimum amount of time (e.g., 2 seconds, 3 seconds, etc.) thereby creating a sense of trust with customers.

For example, FIG. 5A illustrates a process 500 of the software application 322 adding time to a waiting period. For example, the software application 322 may request a waiting period with the waiting period service 400. In response, the controller 402 of the waiting period service 400 may receive the request and identify a buffer of time 512 to add to the waiting period based on timing values stored within a pause storage data store 510. Here, the pause storage data store may include a mapping of an amount of time to add to a waiting period based on an initial duration of the waiting period. For example, if the initial waiting period is 1.5 seconds, the mapping may indicate that 2.5 seconds needs to be added to the waiting period. Here, the buffer of time 512 corresponding to the waiting period may be added to an entry 514 in the queue 410.

In this example, the animation is selected based on an amount of time of the waiting period and the amount of time included in the additional time added to the waiting period. For example, initially, the waiting period is 2.20 seconds. Here, the system adds a buffer of 3.80 seconds to the initial waiting period of 2.20 seconds to create a total waiting period of 6.00 seconds. The software application 322 may select the animation file to play based on the combined durations of the initial waiting period and the buffer of time 512. In another embodiment, the animation for the additional amount of time is generated via an AI model, such as a GenAI model.

FIG. 5B illustrates a timing signal 520 of the animation. As shown in FIG. 5B, the animation play signal 522 encompasses both the added buffer of time 524 and the initial waiting period time 526.

Figure 6A:
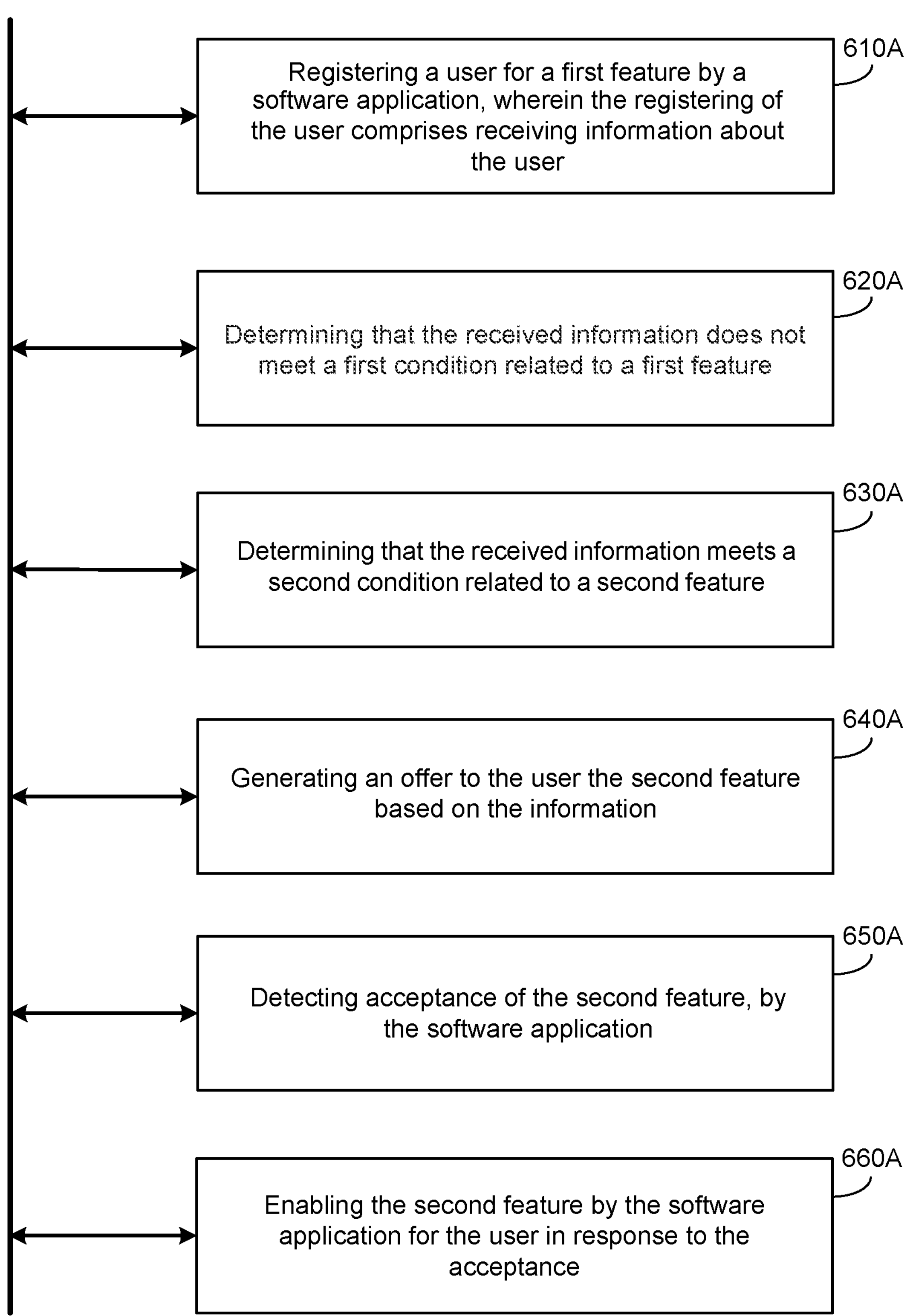
FIG. 6A is a flow diagram illustrating a method of activating a feature based on behavior with an alternative feature according to example embodiments.

FIG. 6A illustrates a method 600A of activating a feature based on behavior with an alternative feature according to example embodiments. As an example, the method 600A may be performed by a computing system, a software application, a server, a cloud platform, a combination of systems, and the like. Referring to FIG. 6A, in 610A, the method may include registering a user for a first feature by a software application, wherein the registering the user comprises receiving information about the user. During the registering, the user may provide personal information, employment history, and the like, which can be maintained by the software application and used to provide context over time.

In 620A, the method may include determining that the information does not meet a first condition related to a first feature. In 630A, the method may include determining that the information meets a second condition related to a second feature. In 640A, the method may include generating an offer to the user the second feature based on the information In 650A, the method may include detecting acceptance of the second feature, by the software application. In 660A, the method may include enabling the second feature by the software application for the user in response to the acceptance. In some embodiments, the method may include determining that a condition related to the predetermined condition has been met by the user related to the second feature, by the software application. In some embodiments, the method may include, in response to the determining, enabling the first feature, via the software application. In some embodiments, a temporal re-evaluation of the data is performed when enabling the first feature.

In some embodiments, the offering may include displaying a graphical element associated with the second feature via a user interface of the software application, and the detecting comprises detecting a selection of the graphical element via the user interface. In some embodiments, the enabling of the second feature may include downloading a software application associated with the second feature from an external data source and installing the software application via a user device of the user. In some embodiments, the determining may include determining that one or more actions of the user with the second feature have satisfied a predetermined acceptance criteria. In some embodiments, in response to the determining, the method may include automatically displaying a window with an acceptance for the first feature via a user interface of the software application.

In some embodiments, the detecting may include detecting a selection of a button on the window or receiving a verbal command to automatically activate a software feature associated with the first feature on a user device of the user. In some embodiments, the enabling of the first feature may include installing the first feature on a user device of the user, and automatically activating the first feature after installation on the user device. In some embodiments, the determining may include receiving an external trigger from a remote server with a notification that the condition has been met by the user.

Figure 6B:
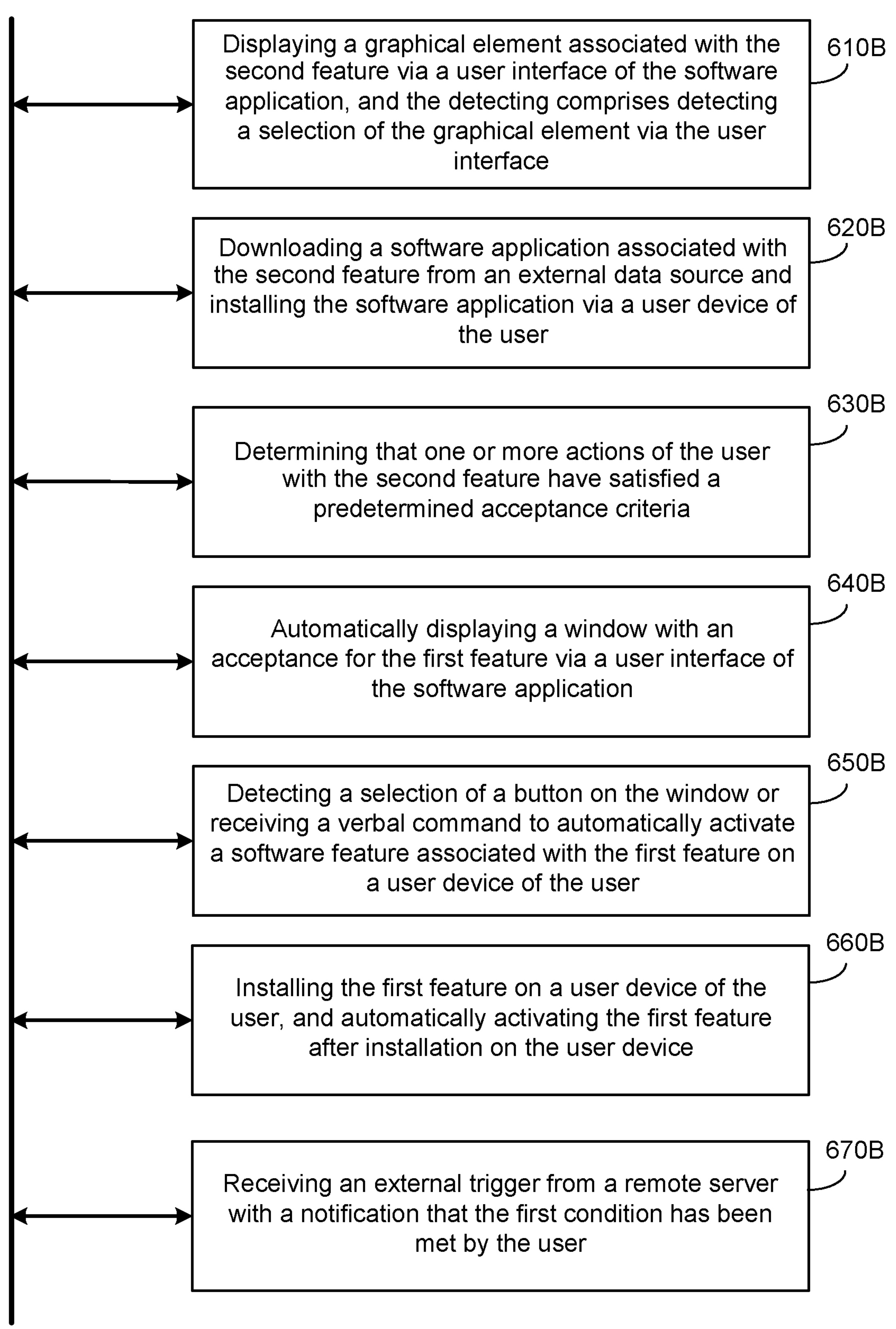
FIG. 6B is another flow diagram, according to example embodiments.

FIG. 6B illustrates a flow diagram for method 600B, according to example embodiments. As an example, the method 600B may be performed by a computing system, a software application, a server, a cloud platform, a combination of systems, and the like. Referring to FIG. 6B, in 610B, the method may include displaying a graphical element associated with the second feature via a user interface of the software application, and the detecting comprises detecting a selection of the graphical element via the user interface. In 620B, the method may include downloading a software application associated with the second feature from an external data source and installing the software application via a user device of the user. In 630B, the method may include determining that one or more actions of the user with the second feature have satisfied a predetermined acceptance criteria. In 640B, the method may include in response to the determining, automatically displaying a window with an acceptance for the first feature via a user interface of the software application. In 650B, the method may include detecting a selection of a button on the window or receiving a verbal command to automatically activate a software feature associated with the first feature on a user device of the user. In 660B, the method may include installing the first feature on a user device of the user, and automatically activating the first feature after installation on the user device. In 670B, the method may include receiving an external trigger from a remote server with a notification that the condition has been met by the user.

Figure 7A:
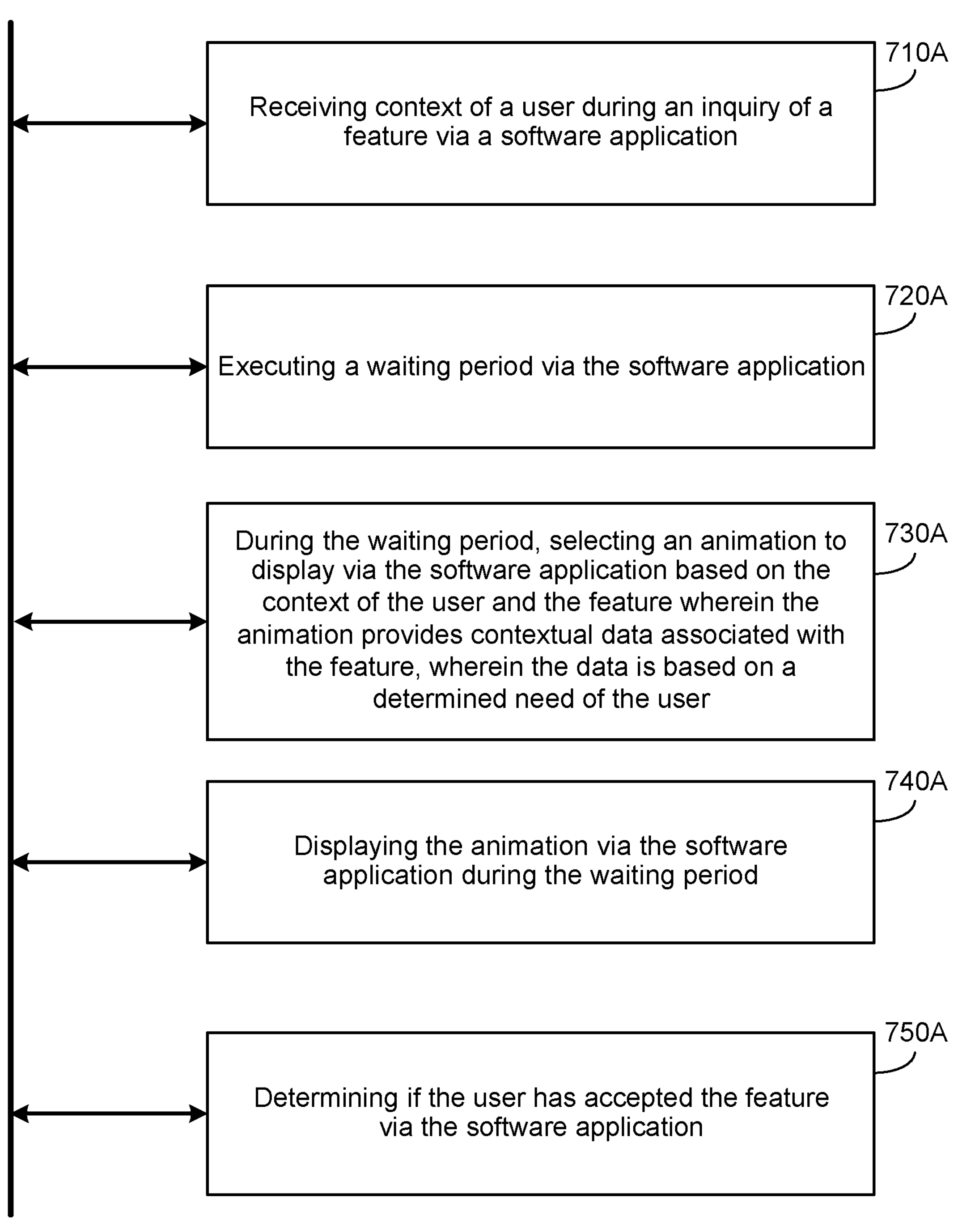
FIG. 7A is a flow diagram illustrating a method of dynamically selecting an animation based on a waiting period according to example embodiments.

FIG. 7A illustrates a method 700A of dynamically selecting an animation based on a waiting period according to example embodiments. As an example, the method 700A may be performed by a computing system, a software application, a server, a cloud platform, a combination of systems, and the like. Referring to FIG. 7A, in 710A, the method may include receiving context of a user during an inquiry of a feature via a software application. As an example, the context may include content from a registration request, application, submission, etc. which the user previously submitted in an effort to apply for a feature associated with the software.

In 720A, the method may include executing a waiting period via the software application. In 730A, the method may include, during the waiting period, selecting an animation to display via the software application based on the context of the user and the feature wherein the animation provides contextual data associated with the feature, wherein the data is based on a determined need of the user. In 740A, the method may include displaying the animation via the software application during the waiting period. In 750A, the method may include determining if the user has accepted the feature via the software application.

In some embodiments, the method may further include determining if the user has accepted the feature within a time threshold after an ending of one or more of the waiting periods or animations. In some embodiments, the method may further include determining if the user has not accepted the feature within a time threshold, and in response to the user, one or more of offering a different feature or selecting a different animation, via the software application.

In some embodiments, the receiving the context may include receiving qualifications of the user with respect to the feature and determining whether to show the user a message based on the qualifications. In some embodiments, the determining may include determining a likelihood of the user accepting the feature based on execution of an artificial intelligence (AI) model on the qualifications of the user and determining whether to show the user the message based on the likelihood of the user accepting the feature.

In some embodiments, the method may further include receiving additional context of the user during the displaying of the animation, storing the additional context via a data store associated with the software application, and performing one or more of augmenting the animation being displayed or selecting a different animation to display, via the software application, based on the additional context. In some embodiments, the displaying may include playing the animation within a window of the software application during the waiting period. In some embodiments, the receiving the context comprises receiving an image of the user, executing a facial recognition algorithm on the image of the user to identify a state of the user, and dynamically selecting the animation from a plurality of animation files in memory based on the state of the user and a label assigned to the animation.

FIG. 7B illustrates a flow diagram for method 700B, according to example embodiments. As an example, the method 700B may be performed by a computing system, a software application, a server, a cloud platform, a combination of systems, and the like. Referring to FIG. 7B, in 710B, the method may include determining if the user has accepted the feature within a time threshold after an ending of one or more of the waiting period or the animation. In 720B, the method may include determining if the user has not accepted the feature within a time threshold, and in response, one or more of offering a different feature or selecting a different animation, to the user via the software application. In 730B, the method may include receiving the context, comprising receiving qualifications of the user with respect to the feature, and determining whether to show the user a message based on the qualifications. In 740B, the method may include determining a likelihood of the user accepting the feature based on execution of an artificial intelligence (AI) model on the qualifications of the user and determining whether to show the user the message based on the likelihood of the user accepting the feature. In 750B, the method may include receiving additional context of the user during the displaying of the animation, storing the additional context via a data store associated with the software application, and performing one or more of augmenting the animation being displayed or selecting a different animation to display, via the software application, based on the additional context. In 760B, the method may include playing the animation within a window of the software application during the waiting period. In 770B, the method may include receiving an image of the user, executing a facial recognition algorithm on the image of the user to identify a state of the user, and dynamically selecting the animation from a plurality of animation files in memory based on the state of the user and a label assigned to the animation.

Figure 8A:
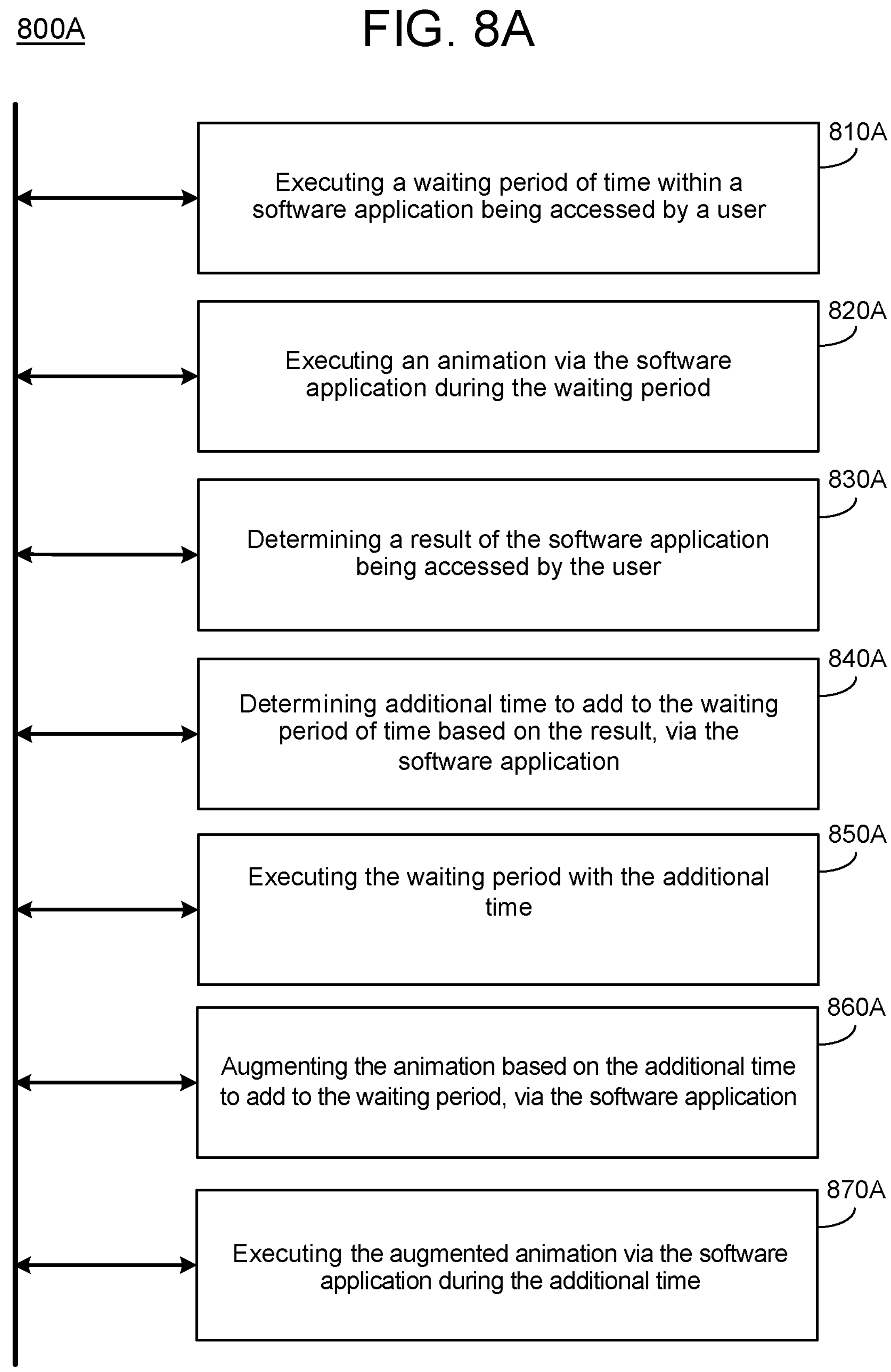
FIG. 8A is a flow diagram illustrating a method of determining additional time to add to a waiting period according to example embodiments.

FIG. 8A illustrates a method 800A of determining additional time to add to a waiting period according to example embodiments. As an example, the method 800A may be performed by a computing system, a software application, a server, a cloud platform, a combination of systems, and the like. Referring to FIG. 8A, in 810A, the method may include executing a waiting period of time within a software application being accessed by a user. In 820A, the method may include executing an animation via the software application during the waiting period.

In 830A, the method may include determining a result of the software application being accessed by the user. In 840A, the method may include determining additional time to add to the waiting period of time based on the result, via the software application. In 850A, the method may include executing the waiting period with the additional time. In 860A, the method may include augmenting the animation based on the additional time to add to the waiting period, via the software application. In 870A, the method may include executing the augmented animation via the software application during the additional time.

In some embodiments, the executing of the waiting period may include executing the waiting period within a window of the software application, and the executing of the animation comprises playing the animation within the window of the software application. In some embodiments, the determining of the additional time to add to the waiting period may include determining the additional time to add based on a feature being offered by the software application. In some embodiments, the determining of the additional time to add to the waiting period may include determining the additional time to add to the waiting period based on a function that is to be performed by the software application during the waiting period.

In some embodiments, the determining may include determining how much time to add to the waiting period based on an entry stored in a lookup table of the software application which includes a mapping from the result to an amount of time to include in the waiting period. In some embodiments, the method may include selecting the animation to execute during the waiting period based on the additional time added to the waiting period. In some embodiments, the method may further include playing the animation until an end of the additional time added to the waiting period.

Figure 8B:
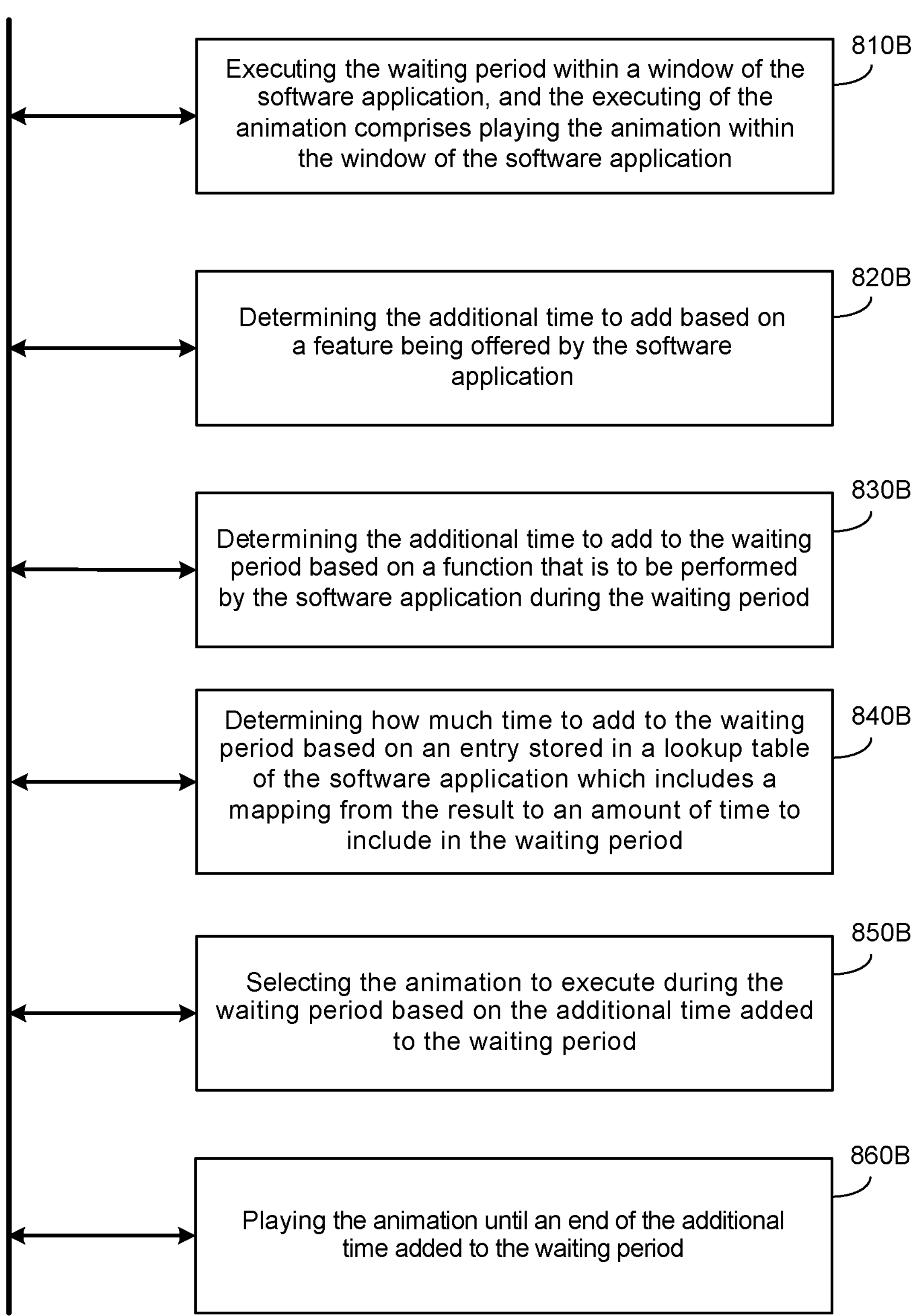
FIG. 8B is another flow diagram according to example embodiments.

FIG. 8B illustrates a flow diagram for method 800B, according to example embodiments. As an example, the method 800B may be performed by a computing system, a software application, a server, a cloud platform, a combination of systems, and the like. Referring to FIG. 8C, in 810B, the method may include executing the waiting period within a window of the software application, and the executing of the animation comprises playing the animation within the window of the software application. In 820B, the method may include determining the additional time to add based on a feature being offered by the software application. In 830B, the method may include determining the additional time to add to the waiting period based on a function that is to be performed by the software application during the waiting period. In 840B, the method may include determining how much time to add to the waiting period based on an entry stored in a lookup table of the software application which includes a mapping from the result to an amount of time to include in the waiting period. In 850B, the method may include selecting the animation to execute during the waiting period based on the additional time added to the waiting period. In 860B, the method may include playing the animation until an end of the additional time added to the waiting period.

In one alternate embodiment of the instant solution (otherwise, herein called the application or software application), users are guided through an alternate qualification pathway when they do not initially meet the criteria for a desired feature, such as a mortgage. This pathway involves providing users with options to improve their financial standing, such as opening a savings account or education on credit score enhancement, ultimately leading to automatic mortgage qualification once the user meets the necessary criteria. For example, a user may apply for a mortgage using the provided software application. The user fills out a detailed mortgage application form on a user interface (UI), providing personal and financial information. The software application, which may be hosted on a cloud platform, processes the mortgage application, and the user's data is validated against mortgage eligibility criteria using an eligibility-checking module within the software application. Upon determining that the user does not qualify for the mortgage due to a credit score and savings history, the software application triggers a different service path. This path may include an automated financial advisory system that sends a message to the user's UI suggesting the user open a new savings account, which can be done directly through the software application. Alongside this, the automated financial advisory system may offer a credit score improvement consisting of personalized tips and actions the user can take to enhance creditworthiness, packaged as a module within the software application.

In one embodiment, a monitoring system component, which may be a component of the instant solution, tracks activities as the user interacts with the software application, making deposits into a new savings account and following the credit score improvement plan. It continuously updates the user's financial profile in the software application's database, linked to a credit monitoring service. The monitoring system is designed to send a message to the credit monitoring service periodically, requesting updates on the user's credit score. When the monitoring system detects that the user's credit score has crossed the threshold required for the mortgage application and that savings meet the minimum required balance, it sends a message to a mortgage eligibility-checking module to reassess the mortgage application. The monitoring system's AI component evaluates the improved financial standing against the mortgage criteria and, upon a positive match, triggers a mortgage approval process. The software application may then send a message to a mortgage processing module, instructing it to draft the approval notification. The user receives this as an automated message through the UI, indicating that the user has been pre-approved for the mortgage based on the updated qualifications. The user may be informed that no further action is required. The mortgage approval is automatic, leveraging the monitoring system's capability to act on the updated financial status without needing a new mortgage application submission. The instant solution provides an alternative path to users who initially do not qualify for specific features. It seamlessly transitions them to approval status through continuous monitoring and automated reassessment, enhancing user experience and streamlining the qualification process.

In the current embodiment, the instant solution's components collaborate to provide a comprehensive, automated response to a mortgage application that initially does not meet approval criteria, guiding the user through alternative financial features and educational resources to qualify for the mortgage eventually. The user starts the journey with the software application through a UI, which serves as the entry point for data input. This UI is part of a web-based platform, a mobile app, or any other customer-facing portal provided by the host platform through which the user submits personal and financial information for the mortgage application. Once the user submits a mortgage application, it is processed by a module associated with the instant solution, such as an eligibility-checking module. This module assesses the user's financial information, such as income, credit score, and savings, against the mortgage qualification criteria. It is responsible for determining that the user does not currently qualify for the mortgage. The instant solution activates an alternative feature pathway module, another module associated with the instant solution, upon determining the user's ineligibility for the mortgage. The alternative feature pathway module is programmed to analyze the user's financial data and suggest actionable alternatives that may eventually lead to mortgage qualification. It leverages the data stored in the software application's database to offer the user a personalized financial improvement plan, which may include opening a new savings account with the bank and a series of steps to improve their credit score. A monitoring system may track users' activities and financial progress as they engage with alternative features and educational resources. The monitoring system may continuously update the user's financial profile within the software application's database. It is designed to monitor the user's savings account balances and credit score in real-time, interfacing with external credit monitoring services to receive updated credit score information. A predictive analytics engine may work with the monitoring system, using the user's updated financial data to predict when they might meet the mortgage eligibility criteria. This engine may employ machine learning functionality to analyze user financial behavior patterns and forecast their financial growth. The mortgage processing module is triggered when the user's financial status reaches the thresholds necessary for mortgage approval. This mortgage processing module, a component of the instant solution, initiates the mortgage approval process without requiring the user to reapply. It generates a pre-approval notice based on the user's updated qualifications, which may be communicated to the user through the UI. In one embodiment, a notification system (a component of the instant solution) may inform the user of the automatic mortgage pre-approval. The notification system may utilize the UI to present a message to the user, completing the user-centric loop.

In the described embodiment involving the user's path to mortgage qualification, artificial intelligence (AI) plays several roles in enhancing functionality and user experience, including analyzing the user's initial application data to assess eligibility for the mortgage. By employing machine learning functionality, the instant solution can predict how changes in the user's financial behavior impact their eligibility over time. For example, an AI model can forecast when the user might reach the necessary credit score for mortgage approval based on their current financial trajectory and market trends. Upon rejection, the AI model may employ financial advice and feature recommendations specific to the user's situation. The AI model may suggest which financial behaviors are most likely to improve the user's eligibility, using data from the user's current financial profile and similar user profiles. This suggestion may include opening certain savings accounts that are known to favorably impact users with similar financial patterns. The AI model may continuously monitor the user's financial activities, such as deposits into their savings account and improvements in their credit score. When their financial behavior aligns with the AI model's forecast for mortgage eligibility, the AI model triggers the reassessment process, ensuring the user receives their mortgage offer at an optimal time. The AI model can learn from each interaction. When the recommendations provided to the user result in a successful mortgage application, the instant solution may use this data to refine its AI models, improving the advice given to future applicants with similar profiles. The AI model manages automated communication with the user, delivering personalized updates and notifications through the UI. This communication may include informing the user when they are close to reaching eligibility criteria or have been pre-approved for the mortgage, thus maintaining engagement and trust in the process. The AI model customizes the UI to the user's preferences and response patterns. For example, if the user frequently checks certain financial information, the AI model can ensure these details are prominently displayed at log-in. When users have questions or need assistance, AI-powered chatbots equipped with natural language processing (NLP) capabilities may provide real-time support, understand the users' queries, and supply accurate, contextually relevant information.

In the current embodiment, the AI model may be critical in refining and utilizing data input for the mortgage qualification process. When the user inputs their financial data, this data is received by the AI model. A preprocessing step involves cleaning and structuring this data for analysis. For example, the AI model might standardize date and currency formats, handle missing or incomplete data entries, and encode categorical data for processing. The AI model examines the raw data to identify and construct features that are predictive of mortgage eligibility. This examination may involve deriving new data points, such as the ratio of the user's income to their debt (debt-to-income ratio), which is a critical factor in mortgage approvals. The AI model can analyze user financial behavior patterns using historical data. If the user's savings show regular monthly deposits, the AI model might extrapolate this behavior to predict future account balances, especially when the AI model determines that automatic deposits have been established.

This altered data now includes not just historical values but projected future values. The AI model may also simulate various credit-building scenarios based on the user's financial activities. By altering the data to reflect potential future states—like the impact of paying down existing debt on their credit score—the AI model can more accurately gauge when the user might become mortgage-eligible. The AI model can enrich the user's profile with external data, such as credit reports or market trends, to give a more comprehensive view of the user's financial situation. This enriched data may be more informative and can better train the predictive AI models within the instant solution. The AI model may utilize the altered data to make predictions. For example, the instant solution can forecast (using a predictive AI model) when the user's savings account will reach a threshold that qualifies for better mortgage rates or when their credit score will improve sufficiently to meet the eligibility criteria. Based on the predictive output from the AI model, the AI model may inform the decision-making components of the instant solution. If the AI model determines that the user's profile aligns with the mortgage approval criteria, the mortgage processing module triggers the pre-approval process. The instant solution may continuously employ a feedback loop to refine its AI models, updating its predictions and recommendations as the user interacts with the instant solution and their financial situation evolves. The AI model learns from any new data, such as the user's response to financial advice or changes in their credit score, to improve its accuracy.

In one embodiment, computer storage may store the instant solution, animation files, and/or lookup tables for determining the additional waiting time and any relevant data needed for the processor to execute its functions. The memory may be a non-volatile storage medium such as a hard drive, solid state drive (SSD), flash memory, and the like. Coupled with the memory, the processor is responsible for running the instant solution accessed by the user. Sufficient computational power is necessary to manage multiple tasks, such as executing animation, processing user inputs, and determining results based on user interactions with the software application. Upon a trigger within the software application, the instant solution may initiate a waiting period. This waiting period is a predetermined duration which the user must wait for a process within the software application to complete, such as a data retrieval operation, transaction processing, or communication with a server. Concurrently with the waiting period, the instant solution executes an animation file. This visual element engages the user during the wait, providing feedback to the user that the instant solution is processing their request. The animation files may be stored in the memory and are chosen based on the specific context of the user's actions. While the waiting period is in progress, the processor may evaluate the outcome of the tasks initiated by the user, which may involve checking the completion of a data transaction, the response from a server, or the result of a local computation. Based on the result assessed by the processor, the instant solution determines if there is a need to extend the waiting period. This decision may rely on various factors, such as network latency, processing requirements, or user account status, and is tailored to manage user expectations and enhance trust in the system's reliability. When an additional waiting period is deemed necessary, the processor augments the ongoing animation to reflect the extended time. This additional waiting period involves looping the animation, adding new sequences, or transitioning to a different animation that suits the extended duration better. The augmented animation is played during the additional waiting time, maintaining user engagement and providing a seamless experience to the user while extra time is needed for processing.

In one embodiment of the instant solution, the software application manages waiting periods and animations to enhance user experience. The software application has a UI component that creates a designated window on a device associated with the user. When a waiting period is initiated, this window can be the canvas for displaying the animation. The window can be configured to seamlessly integrate with the software application's interface, ensuring that the animation is visually cohesive. This approach keeps users engaged during waiting periods and provides a focused and interactive space within the software application. The software application may incorporate logic that considers the nature of the waiting period, user preferences, or the task being performed. Based on this contextual information, the instant solution selects an appropriate animation that is visually engaging and relevant to the ongoing process, ensuring users receive a tailored and immersive experience while waiting for the next action within the software application's window.

In one embodiment, the software application employs a waiting period service that manages the waiting periods and animations. The software application can incorporate an evaluation that assesses the specific feature or service offered to the user during the waiting period. This evaluation can consider factors such as the complexity of the feature, its significance to the user, or the processing time required for the transaction. The application can then use this information to dynamically calculate the additional time needed for the waiting period. For example, if the software application is offering a highly complex financial feature, it may determine that users require more time to review and make decisions. In response, the application can automatically extend the waiting period to ensure that the user can consider the offered feature. Conversely, the waiting period can be shorter for simpler offerings to maintain efficiency. The software application can draw from the instant solution's concept of augmenting animations based on additional time. When the application determines that more time is needed, it can select animations that engage the user and provide informative content related to the offered feature.

In one embodiment, the instant solution incorporates an analysis that assesses the specific function or task it needs to perform during the waiting period. This analysis can consider factors such as the complexity of the task, the data processing requirements, or the expected duration for task completion. The software application may calculate the additional time needed for the waiting period based on these factors. For example, when the software application needs to perform a computationally intensive task during the waiting period, such as complex data analysis or encryption, it may determine that more time is required to complete this task effectively. Consequently, the application can automatically extend the waiting period to ensure the task is executed without interruptions or delays. The application can augment animations based on additional time. When it determines that the function to be performed requires more time, it can select animations that engage the user and convey information related to the ongoing function, keeping the user informed and engaged.

In one embodiment, the instant solution can incorporate a lookup table or a similar data structure that stores predefined mappings between various results or outcomes of the software application's processes and the corresponding additional time required for the waiting period. This lookup table may be located on the same device as the processor or remotely, such as in a remote computer or server. This lookup table can be populated with entries representing different scenarios, such as the successful completion of a task, an error occurring, or specific user actions triggering adjustments in waiting time. For example, when the software application performs a task and anticipates different outcomes, such as a quick success or a potential error, it can consult the lookup table to determine how much additional time should be added to the waiting period for each scenario. When the task succeeds, the table might specify a short waiting time. In contrast, if an error occurs, the table might instruct the application to significantly extend the waiting period to allow troubleshooting or recovery actions. This approach aligns with the instant solution's principles of dynamically managing waiting periods and ensuring that the waiting time is tailored to the specific circumstances. The software application can efficiently determine the appropriate waiting time based on the outcome of its processes using a lookup table, thereby enhancing user experience and optimizing task execution.

In one embodiment, the software application can leverage its existing animation repository, which may contain a variety of animations suitable for different waiting scenarios. This repository may be located on the same device as the processor or remotely, such as in a remote computer or server. With the knowledge of the adjusted waiting time obtained from the lookup table or similar data structure, the application can prioritize animations that match the expected duration. For example, if the additional time is substantial, the software application can select longer, more elaborate animations. Conversely, if the added time is minimal, it may opt for shorter animations to balance engagement and efficiency. The software application can also consider the user's preferences or context. When the user has indicated preferences for certain types of animations or the context of the ongoing task suggests a specific animation theme, the application can prioritize animations that align with these preferences.

In one embodiment, when the application determines the need to add additional time to a waiting period, it can incorporate this extended duration into the animation playback logic. The application can ensure that the selected animation is played continuously until the combined waiting period and the additional time has elapsed. The software application may utilize timers or other timekeeping mechanisms. It can synchronize the animation's playback with the total time required, allowing it to seamlessly transition from the initial waiting period to the added time while the animation continues without interruption. The software application can provide options for users to interact with the animation during this extended period if applicable. For example, if the animation includes interactive elements or buttons, users can engage with the animation, which can help maintain their interest and involvement.

In one embodiment, the software application may receive contextual information about a user during a feature inquiry. This context may include user demographic data, past interactions, current session behavior, or relevant user-specific information. As part of the initial interaction, the UI collects this data and sends it as a message to the software application, which is then responsible for processing it. Upon processing the user's context, the software application determines that a waiting period is necessary, either due to the need for backend processing or as a deliberate pause to enhance user experience. It sends a message to the waiting period service, instructing it to commence the waiting period. This message may include details such as the duration of the waiting period and may include identifiers of the user session for tracking purposes. The software application queries an animation repository to retrieve an appropriate animation to display during this waiting period. It sends a message containing the user context and any specific parameters that might influence the selection of the animation, such as the length of the waiting period or the type of feature being inquired. The animation repository selects a suitable animation and responds with a message referencing the animation file or digital stream. The software application then commands the UI to display the chosen animation. This command message specifies which animation to play and how to display it, considering factors like screen size and UI layout. As the animation is displayed, the UI may capture the user's interaction with the animation and send this feedback to the software application. If the user indicates feature acceptance by clicking a "Confirm" or "Accept" button on the UI, this interaction is sent back to the software application as a confirmation message. The software application processes the confirmation message, updating the feature state to reflect the user's feature acceptance. It may also log this interaction in a data store for future analysis and to inform subsequent interactions with the user.

In one embodiment, the software application may coordinate with a waiting period service and the UI. After the software application selects and displays the animation via the UI during the waiting period, it initiates a timer, which may be within the waiting period service, to track the duration of the waiting period and the display time of the animation. When the waiting period and animation have concluded, a message is sent from the waiting period service back to the software application indicating that the waiting period has ended. This message includes a timestamp marking the end of the period. The software application begins a countdown for the specified time threshold, monitoring for user acceptance upon receipt of the message. During this countdown, user interactions are closely monitored through the UI. If the user accepts the feature within this window, an acceptance message is generated by the UI and sent to the software application. This message contains the user's acceptance confirmation and a timestamp, allowing the software application to confirm that the acceptance occurred within the specified time threshold. When the software application does not receive an acceptance message within this time frame, it can trigger additional processes, such as offering a different feature or selecting a different animation. These subsequent actions may also be communicated as messages between the software application and the respective services involved, such as a new request to the animation repository for a different animation or a command to the UI to display a new feature offer. The software application then waits for a response to these new prompts. If a user's acceptance is received, the corresponding message and response time are logged to ensure they align with the newly adjusted expectations and timelines set forth by the application's logic.

In one embodiment, once the waiting period and animation have concluded, as monitored by the waiting period service, and if the user has not interacted with the feature acceptance interface, the software application receives a non-acceptance message. This message includes an indicator that there was a lack of user response within the predetermined time threshold, noted by the absence of a user acceptance signal within the expected timeframe. The software application triggers a decision-making process. It sends a query to the data store to retrieve additional user context and past interactions to understand the user's preferences and potential reasons for non-acceptance. The software application may send a message to the AI model requesting an updated prediction or recommendation based on the latest user interaction data. The AI model processes this request and responds with a message suggesting a different feature or a new engagement strategy. The software application then constructs a new offer. It sends a command to the UI to display a new graphical element associated with an alternative feature offer or to play a different animation, which is selected based on the latest context and AI model recommendations. The message to the UI specifies the new offer's details or the new animation's identifier to be displayed. As the UI displays the new offer or animation, it monitors for user interaction. Any response from the user is encapsulated in a message sent to the software application, whether there was an acceptance of the new offer or further engagement with the animation. This message contains details of the user's action, which the software application then processes to update the user's profile in the data store and to finalize the offering process. A confirmation message is generated and logged when the user accepts the alternative feature. If the user continues not to respond, the software application may repeat the process, either escalating the offer or attempting different engagement strategies.

In one embodiment, the software application receives the user's qualifications either directly from the user through the UI during the feature inquiry or from stored user data within the data store. The received qualifications are typically structured data, such as forms filled out by the user or previously gathered analytics. This data is then passed on from the software application to an AI model, with a message indicating that a prediction is needed based on the user's qualifications. The AI model, equipped with machine learning functionality, analyzes this data to predict the user's interest in the feature and likelihood of acceptance. The AI model sends back a message to the software application containing the results of its analysis, including a recommendation on whether to show the user a message and its content. The content of this message is tailored based on the user's qualifications and the AI model's prediction of the user's preferences and needs. The software application then sends a command to the UI, instructing it to display a message to the user. This message may prompt further action, such as confirming feature acceptance or additional information on the feature tailored to the user's qualifications. Upon receiving the command, the UI displays the message to the user and waits for a response. Any interaction from the user in response to the message is captured by the UI and sent back to the software application as a message indicating the user's action, such as clicking a button or entering information. The software application processes the user's response, updates the user's data in the data store accordingly, and takes any subsequent actions that may be warranted based on the user's interaction with the message. Each step involves sending and receiving messages containing specific instructions, user data, and system responses.

In one embodiment, when the user provides their qualifications during the feature inquiry, these details are collected by the software application via the UI involving the user submitting information through forms or the software application pulling existing data from the data store. The software application then sends a message containing the user's qualifications to the AI model. This message is structured to request an analysis of the likelihood of the user accepting the feature based on the provided qualifications. Upon receiving this message, the AI model executes its functionality to predict the user's behavior. It processes the qualifications against historical data patterns and outputs a prediction. The result, a calculated likelihood of feature acceptance, is included into a message and sent back to the software application. The software application determines the next step by receiving the AI model's prediction. If the AI model indicates a high likelihood of acceptance, the software application may send a message to the UI to display a targeted message or offer to the user, encouraging them to accept the feature. This message to the UI includes instructions on what message or offer to display, tailored according to the AI model's prediction. The UI executes the command from the software application, displaying the message or offer to the user and monitoring the user's response. Any interaction by the user with this targeted content is captured and sent back to the software application as a feedback message. This feedback includes the user's action, such as clicking an "Accept" button, or it may simply be a timestamp indicating the user viewed the message but took no action. The software application then processes this feedback, updating the data store with the user's latest interactions and adjusting the user's profile to refine future predictions. When the user accepts the offer, a confirmation message is sent to the relevant systems, such as a feature management system, to initiate feature enrollment. If the user does not accept, the software application may reassess the strategy, possibly initiating another round of AI model prediction and response.

In one embodiment, as the animation is displayed to the user during the waiting period, the software application gathers user context, including additional user inputs, user interactions with the animation, or other user actions captured via the UI. These inputs are sent as messages from the UI to the software application, indicating the level of real-time user engagement and behavior. The software application then sends this additional user context to the data store, instructing it to log the new information. The message to the data store includes specific details of the user's interactions, such as time spent on particular animation frames, clicks within the UI, or any other form of engagement. The software application requests the AI model to process the new user context. The AI model processes this information and sends a message to the software application with insights or recommendations on how to proceed, whether to continue with the current animation, augment it, or select a different one altogether. Based on the AI model's feedback, the software application sends a command to the animation repository if a change of animation is advised. The message specifies the criteria for the new animation selection, which may include the additional context received from the user. The animation repository responds by returning the selected animation file to the software application. Upon receipt of the new animation file, the software application sends a message to the UI to update the display. This message contains instructions for playing the new or augmented animation, tailored to the user's most recent interactions and context. As the UI plays the updated animation, it monitors the user's reactions, sending continuous feedback to the software application. This feedback may trigger further updates or adaptations, creating a feedback loop that refines the user's experience in real-time.

In one embodiment, the software application, which is the orchestrator of the process, receives a trigger that a waiting period is to commence. This trigger may be a user action or a system-generated event that requires a pause in interaction. Upon this trigger, the software application sends a message to the waiting period service to initiate the waiting period. This message includes details such as the duration of the waiting period and the user session identifier. The software application communicates with the animation repository to select an appropriate animation. It sends a message containing the user's context and the waiting period's nature. The animation repository processes this request and responds with a message that includes a reference to the selected animation file, which aligns with the context provided. Upon receiving the animation file reference, the software application sends a command to the UI to display the animation. This command message specifies which animation to play and in which UI window it should be displayed. Following the received instructions, the UI plays the animation within the designated window and monitors for any user interaction. As the animation plays, the UI captures any direct user interactions, such as clicks or keystrokes, and sends these as messages back to the software application. These messages detail the user's reactions to the animation, which can be used for real-time feedback or stored in the data store for future analysis. Upon the conclusion of the waiting period, the software application receives a message from the waiting period service signaling that the waiting period has ended. When the user has interacted with the software application in a manner indicating acceptance of the feature, this acceptance is communicated back to the software application as a message from the UI. The software application then processes all received messages to update the system's state, log interaction data, and proceed with the next steps in the user's journey within the application.

In one embodiment, facial recognition is utilized to determine the user's state and select an animation accordingly; the software application acts as the central node coordinating the various components of the system. When the user interacts with the software application, particularly when a waiting period or a user action necessitates a response, the UI captures an image of the user, such as via a camera on the user's device. This image is sent as a message from the UI to the software application, which then forwards it to a portion of the software application, referred to herein as a facial recognition service—a specialized component capable of analyzing the image. The facial recognition service processes the user's image to determine their emotional state. It might, for example, recognize expressions indicative of confusion, impatience, or interest. The results of this analysis are encapsulated in a message that includes the identified state of the user and is sent back to the software application. The software application then communicates with the animation repository. It sends a request that includes the user's emotional state and asks for an animation corresponding to it. The repository may utilize a label-matching functionality to find an animation file tagged with labels that match the user's state. The chosen animation file reference is then sent back to the software application as part of a response message. The software application receives this reference and instructs the UI to display the selected animation. The message to the UI contains the file path or identifier for the animation and instructions on how to play it within the UI window, tailored to the recognized emotional state of the user. Throughout the animation display, the UI may continue capturing and sending user reactions to the software application. If the user's state changes or takes an action indicative of their intent, such as accepting a feature offer or requesting additional information, these interactions are sent as messages to the software application. The software application processes these interactions to refine the user's profile within the data store, potentially influencing future interactions. This continuous loop of capturing user states, selecting animations, and responding to user actions forms a dynamic system that adapts to real-time user feedback.

In one embodiment, a user registration begins with the software application collecting user information. This registration is facilitated through the UI, where the user inputs their details. The UI then sends a message to the software application containing the user's information. This message may include data like the user's personal details, preferences, and history of interactions with the application. Once the user is registered for the first feature, the software application assesses whether the user meets the predetermined conditions for this feature. This assessment may involve querying a data store containing user data and feature eligibility criteria. The software application offers a second feature if the conditions are unmet, involving sending a command to the UI to display a graphical element or notification related to the second feature. When the user interacts with the offered second feature, their acceptance action (such as clicking on a button or link) is captured by the UI and sent back to the software application as a message indicating their acceptance. Upon receiving the acceptance message, the software application initiates the process to enable the second feature for the user, involving several internal processes and interactions with external systems, especially if the feature requires additional resources or integrations. For example, enabling a feature might involve accessing a feature management system or downloading additional components from an external data source. The software application continuously monitors the user's interactions with the second feature. This monitoring is communicated through messages from the UI to the software application, detailing the user's activities. Once the software application determines that the user has met the conditions related to the predetermined condition of the first feature, it initiates enabling the first feature. The enabling of the first feature involves the software application sending messages to various system components to activate the feature, which may include updating the user's profile in the data store to reflect the new feature access and sending commands to the UI to update the user's available features. This process exchanges messages between the UI, software application, data store, and possibly external systems.

In one embodiment, after the software application determines that the user does not meet the criteria for the first feature and decides to offer the second feature, it sends a message to the UI component. This message contains instructions to display a graphical element associated with the second feature. This graphical element may be a button, link, or any interactive visual cue representing the second feature's offer. Upon receiving this instruction, the UI renders the graphical element on the screen for the user. This action is designed to attract the user's attention and prompt an interaction. When the user interacts with this graphical element, such as via clicking a button or tapping a link, the UI captures this interaction. This interaction, essentially the user's acceptance of the second feature, is sent back as a message from the UI to the software application. This message indicates that the user has selected the graphical element associated with the second feature. The message may contain details such as the interaction time, the specific element interacted with, and any other relevant metadata that might assist the software application in processing the response. Upon receiving confirmation of the user's acceptance of the second feature, the software application proceeds to enable this feature for the user. This enabling process might involve backend operations, such as updating the user's profile, modifying access permissions, or initiating any necessary setup processes for the second feature. These operations might also involve sending and receiving messages to and from other system components, such as databases or external services, to ensure that the second feature is properly configured and accessible to the user.

In one embodiment, once the user accepts the second feature through the UI, as detected and communicated to the software application, the process of enabling this feature begins. The software application may determine that enabling the second feature requires downloading additional software packages. It requests an external data source, a cloud server, or a software repository to retrieve the necessary software package. This request message includes specifics such as the type of software needed, the version compatible with the user's device, and any user-specific configurations. Upon receiving this request, the external data source processes it and sends the software package back to the software application. This response may be a direct software download link or a data stream containing the software files. The software application then sends a message to the user's device, instructing it to initiate the download of the software package. This message might include the download link or initiate a transfer of the software files directly. The user's device, responding to this instruction, begins downloading the software files. This process might involve displaying a progress bar or notifications on the UI to keep the user informed. When the download is complete, a confirmation message is sent from the user's device back to the software application, indicating that the software package has been successfully downloaded. The software application then instructs the user's device to begin installation. This instruction is sent as a message containing commands to execute the installation. The user's device processes these commands, installs the software package, and sends a completion message back to the software application upon successful installation. This message confirms that the second feature's associated software is now installed and ready for use.

In one embodiment, when the second feature is enabled for the user, the software application begins monitoring the user's interactions with this feature. This monitoring involves tracking and analyzing how the user engages with the second feature via the UI. The UI captures user actions such as clicks, navigations, time spent on certain functionalities, or other forms of interaction relevant to the acceptance criteria. These user interactions are continuously sent from the UI to the software application as data messages. Each message contains details about the specific interaction, including the type of action performed, the timestamp of the interaction, and any other relevant context. The software application receives these messages and processes them against the predetermined acceptance criteria for the second feature. This processing may involve comparing the user's actions to predefined thresholds or patterns that indicate satisfactory engagement with the feature. For example, when the criteria include a certain amount of usage time or completion of specific tasks within the feature, the software application evaluates the received interaction data against these benchmarks. When the software application determines that the user's interactions meet the acceptance criteria, it sends a confirmation message within its system. This message acts as an internal trigger indicating that the user has satisfactorily engaged with the second feature, and it may initiate further actions as per the system's design. For example, this may initiate the process of enabling the first feature for the user. The software application may also update the user's records in the data store with this new information, recording that the user has met the acceptance criteria for the second feature. This information is crucial for maintaining a comprehensive user profile and informing the user of future interactions and feature offerings.

In one embodiment, after enabling the second feature for the user, the software application continues to monitor the user's interactions with it. This monitoring may be conducted through the UI, which tracks and records the user's actions, such as clicks, navigation patterns, and time spent on various functionalities of the second feature. The UI sends these interaction data points back to the software application as structured messages detailing each interaction and its context. The software application processes these messages to assess whether the user has met the conditions related to the predetermined criteria for the first feature. This assessment might involve comparing the user's interactions against predefined thresholds or patterns indicative of satisfactory engagement with the second feature. When the software application determines that the user has met these conditions, it initiates the process to offer the first feature to the user. It sends a command to the UI to display a new window or dialog box specifically designed for the acceptance of the first feature. This command message may include details on how and where to display this acceptance window and any relevant information about the first feature that might be necessary for the user to make an informed decision. Upon receiving this command, the UI renders the acceptance window for the first feature on the user's screen. The window might include details about the first feature, an acceptance button, and possibly additional information or prompts to guide the user. As the user interacts with this acceptance window, their actions are captured by the UI and sent back to the software application as response messages. For example, when the user clicks an "Accept" button, this action is included in a message and communicated to the software application, signaling the user's acceptance of the first feature. Upon receiving confirmation of the user's acceptance, the software application proceeds with the necessary steps to enable the first feature for the user, which may involve updating the user's profile in the data store to reflect the new feature access, configuring any required settings, and potentially interacting with other system components to ensure the first feature is fully operational for the user.

In one embodiment, when the software application determines that the conditions for offering the first feature are met, it sends a command to the UI to display an acceptance window for the first feature. This command may include details about the window layout, the feature information, and interactive elements like buttons or voice command prompts. Upon receiving this command, the UI renders the acceptance window on the user's screen. This window captures the user's decision regarding the first feature, offering options such as an "Accept" button or a voice command interface for verbal acceptance. When the user interacts with this window, either by clicking the button or using a verbal command, the UI captures this interaction. For a button click, the UI generates a message indicating that the user has selected the acceptance button, including details like the interaction time and the specific button pressed. In the case of a verbal command, the UI processes the spoken words using a voice recognition function, converts them into a structured command message, and sends it to the software application. This message indicates that the user has verbally accepted the first feature. The software application proceeds to validate the user's acceptance upon the reception of either of these messages. It updates the system's state to reflect this new acceptance, enabling the first feature for the user. This process might involve sending messages to other system components, like a feature management system or a database, to update the user's profile and permissions. The software application may log this interaction in a data store for record-keeping and future analysis. This data includes the user's decision, the method of acceptance (click or verbal command), and the timestamp of the interaction.

In one embodiment, following the user's acceptance of the first feature, as detected by the software application (either through a button click or a verbal command as previously described), the software application initiates the process to install and activate the first feature on the user's device. The software application sends a message to an external server or repository requesting the necessary files or installation package for the first feature. This request message may include details such as the specific feature being requested, the version compatible with the user's device, and any user-specific configurations or settings. Upon receiving the request, the external server processes it and responds with a message containing the installation package or a download link for the first feature. This response message is sent to the software application, which then forwards it to the user's device. The user's device receives this message and begins the download and installation process. During this process, the user's device may send periodic status updates to the software application as messages. These updates include progress notifications, any errors or issues encountered, and a completion confirmation once the installation is successful. Once the installation is confirmed, the software application sends an activation command to the user's device. This command message instructs the device to activate or enable the newly installed first feature, making it available for the user. The user's device processes this activation command to enable the first feature. It may send a confirmation message to the software application indicating that the first feature is active and ready for use. Throughout this process, the software application may also interact with a data store to update the user's profile and record the successful installation and activation of the first feature. This information is crucial for maintaining an up-to-date record of user interactions and application feature access.

In one embodiment, the software application monitors the user's interactions with the second feature, as previously described. This monitoring may be conducted through the UI, which tracks and sends user interaction data to the software application. The fulfillment of conditions for the first feature also involves receiving an external trigger. This external trigger may come from a remote server, a third-party service, or an integrated system that tracks broader user activities or conditions beyond the scope of the immediate software application. For example, this may be a financial system verifying that the user has reached a certain account balance or a credit scoring system updating the user's credit score. When the user meets the specified condition for the first feature, the remote server sends a notification to the software application. This notification is a message that includes details such as the specific condition that has been met and the relevant user identifier. The message serves as a trigger for the software application to begin enabling the first feature for the user. Upon receiving this message, the software application validates the information and updates the user's status. It may also interact with internal components, such as a feature management system or a user database, to update the user's access permissions and prepare the first feature for activation. These interactions are facilitated through messages sent within the system, instructing various components to update their records and configurations based on the new information. The software application then sends a command to the UI to notify the user that the first feature is now available and can be enabled. The UI, in turn, displays this information to the user, potentially prompting them to take action to activate the feature.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), digital versatile disc read-only memory ("DVD-ROM") or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 9 illustrates an example computer system architecture, which may represent or be integrated in any of the above-described components, etc.

Figure 9:
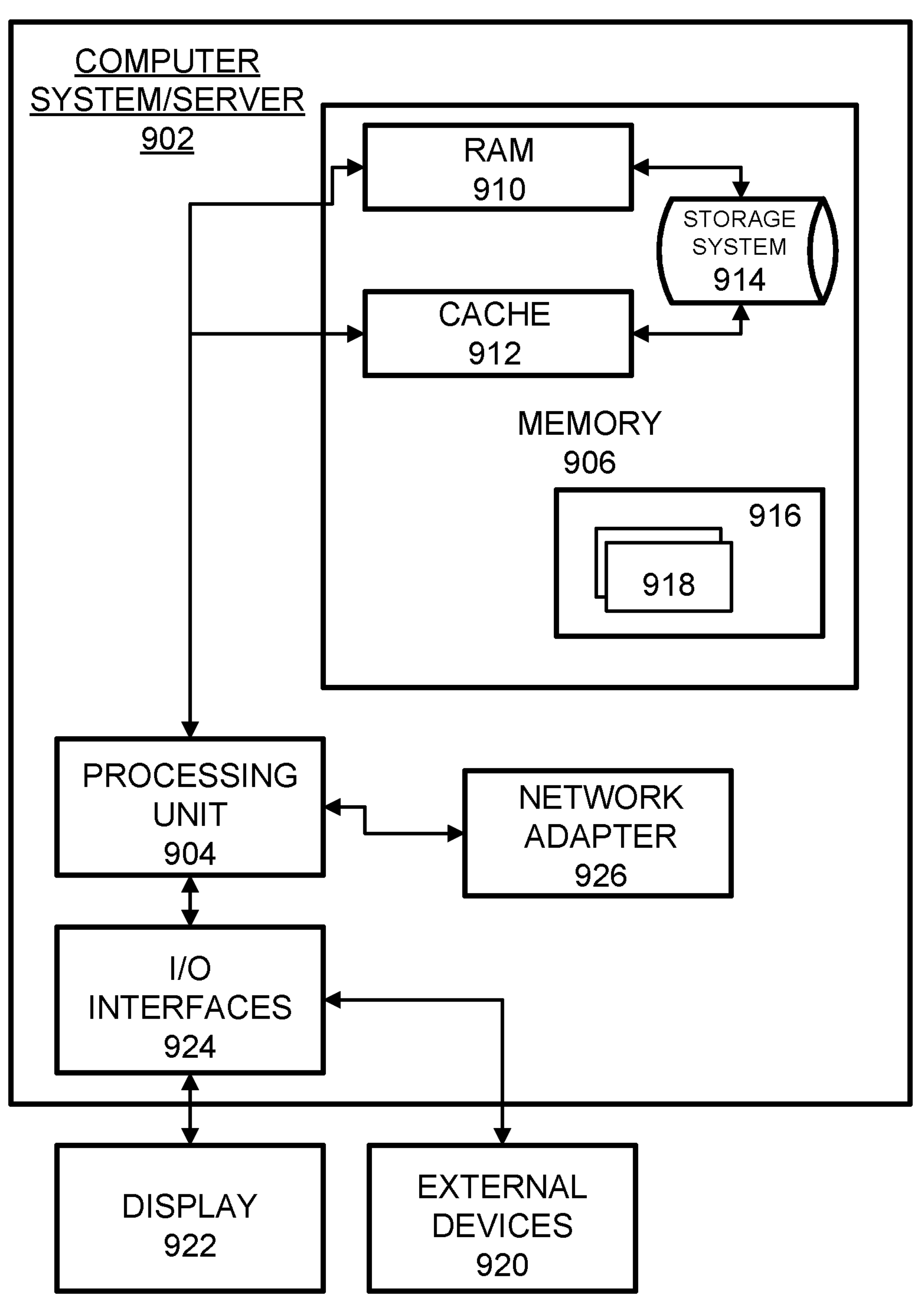
FIG. 9 is a diagram illustrating a computing system that may be used in any of the example embodiments described herein.

FIG. 9 illustrates an example system 900 that supports one or more of the example embodiments described and/or depicted herein. The system 900 comprises a computer system/server 902, which is operational with numerous other general purpose or special purpose computing system environments or configurations. Examples of well-known computing systems, environments, and/or configurations that may be suitable for use with computer system/server 902 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 902 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 902 in the example system 900 is shown in the form of a general-purpose computing device. The components of computer system/server 902 may include, but are not limited to, one or more processors or processing units (processor 904), a system memory 906, and a bus that couples various system components including the system memory 906 to the processor 904.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 902 typically includes a variety of computer system readable media. Such media may be any available media that is accessible by computer system/server 902, and it includes both volatile and non-volatile media, removable and non-removable media. The system memory 906, in one embodiment, implements the flow diagrams of the other figures. The system memory 906 can include computer system readable media in the form of volatile memory, such as random-access memory (RAM) 910 and/or cache memory 912. Computer system/server 902 may further include other removable/non-removable, volatile/non-volatile computer system storage media. By way of example only, storage system 914 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, the system memory 906 may include at least one program product having a set (e.g., at least one) of program modules that are configured to carry out the functions of various embodiments of the application.

Program/utility 916, having a set (at least one) of program modules 918, may be stored in the system memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 902 may also communicate with one or more external devices 920 such as a keyboard, a pointing device, a display 922, etc.; one or more devices that enable a user to interact with computer system/server 902; and/or any devices (e.g., network card, modem, etc.) that enable computer system/server 902 to communicate with one or more other computing devices. Such communication can occur via input/output (I/O) interfaces 924. Still yet, computer system/server 902 can communicate with one or more networks such as a local area network (LAN), a general wide area network (WAN), and/or a public network (e.g., the Internet) via network adapter 926. As depicted, network adapter 926 communicates with the other components of computer system/server 902 via a bus. It should be understood that although not shown, other hardware and/or software components may be used in conjunction with computer system/server 902. Examples, include, but are not limited to, microcode, device drivers, redundant processing units, external disk drive arrays, redundant array of independent disks (RAID) systems, tape drives, and data archival storage systems, etc.

Although an exemplary embodiment of at least one of a system, method, and computer readable medium has been illustrated in the accompanying drawings and described in the foregoing detailed description, it will be understood that the application is not limited to the embodiments disclosed but is capable of numerous rearrangements, modifications, and substitutions as set forth and defined by the following claims. For example, the system's capabilities of the various figures can be performed by one or more of the modules or components described herein or in a distributed architecture and may include a transmitter, receiver, or pair of both. For example, all or part of the functionality performed by the individual modules may be performed by one or more of these modules. Further, the functionality described herein may be performed at various times and in relation to various events, internal or external to the modules or components. Also, the information sent between various modules can be sent between the modules via at least one of a data network, the Internet, a voice network, an Internet Protocol network, a wireless device, a wired device and/or via a plurality of protocols. Also, the messages sent or received by any of the modules may be sent or received directly and/or via one or more of the other modules.

One skilled in the art will appreciate that a "system" may be embodied as a personal computer, a server, a console, a personal digital assistant (PDA), a cell phone, a tablet computing device, a smartphone, or any other suitable computing device, or combination of devices. Presenting the above-described functions as being performed by a "system" is not intended to limit the scope of the present application in any way but is intended to provide one example of many embodiments. Indeed, methods, systems, and apparatuses disclosed herein may be implemented in localized and distributed forms consistent with computing technology.

It should be noted that some of the system features described in this specification have been presented as modules in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code may be a single instruction or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only, and the scope of the application is to be defined solely by the appended claims when considered with a full range of equivalents and modifications (e.g., protocols, hardware devices, software platforms, etc.) thereto.

What is claimed is:

1. An apparatus comprising:

a processor that executes instructions stored in a memory to configure the processor to:

receive contextual information corresponding to a user during an inquiry by the user about a feature of a software application;

in response to the inquiry, execute a waiting period for a response to the inquiry;

select an animation to display during the waiting period based on the contextual information and the inquiry, wherein the animation provides data associated with the feature;

display the animation during the waiting period;

determine if the user has accepted the feature.

2. The apparatus of claim 1, wherein, when the processor determines if the user has accepted the feature, the processor is configured to:

determine if the user has accepted the feature within a certain time after one or more of the waiting period or the animation ends.

3. The apparatus of claim 1, wherein, when the processor determines that the user has not accepted the feature, the processor is configured to:

determine that the user has not accepted the feature within a certain time, wherein, in response to it being determined that the user has not accepted the feature, the processor is further configured to one or more of:

offer a different feature or select a different animation.

4. The apparatus of claim 1, wherein, when the processor receives the contextual information, the processor is configured to:

receive qualifications of the user with respect to the feature, wherein the processor is further configured to:

determine whether to show the user a message based on the qualifications.

5. The apparatus of claim 4, wherein, when the processor determines whether to show the user the message, the processor is configured to:

determine a likelihood of the user accepting the feature based on an execution of an artificial intelligence (AI) model on the qualifications; and determine whether to show the user the message based on the likelihood.

6. The apparatus of claim 1, wherein the processor is configured to:

receive additional contextual information about the user during the display of the animation;

store the additional contextual information in a data store; and based on the additional contextual information, perform one or more of augmenting the animation being displayed or selecting a different animation to display.

7. The apparatus of claim 1, wherein the processor is configured to:

after the animation and the waiting period have ended, determine that the user has not accepted the feature;

in response to the user not having accepted the feature, retrieve additional contextual information about the user and past transactions of the user; and using an artificial intelligence (AI) model, generate a recommendation for a new feature to offer the user.

8. The apparatus of claim 1, wherein, when the processor receives the contextual information, the processor is configured to:

receive an image of the user, wherein the processor is further configured to:

execute a facial recognition algorithm on the image of the user to identify a state of the user; and dynamically select the animation from a plurality of animation files based on the state and a label assigned to the animation.

9. A method comprising:

receiving contextual information corresponding to a user during an inquiry by the user about a feature of a software application;

in response to the inquiry, executing a waiting period for a response to the inquiry;

selecting an animation to display during the waiting period based on the contextual information and the inquiry, wherein the animation provides data associated with the feature;

displaying the animation during the waiting period; and determining if the user has accepted the feature.

10. The method of claim 9, wherein the determining if the user has accepted the feature comprises: further comprising determining if the user has accepted the feature within a certain time after one or more of the waiting period or the animation ends.

11. The method of claim 9, wherein the determining if the user has accepted the feature comprises:

determining that the user has not accepted the feature within a certain time; and in response to it being determined that the user has not accepted the feature, the method further comprises one or more of:

offering a different feature or selecting a different animation.

12. The method of claim 9, wherein the receiving of the contextual information comprises:

receiving qualifications of the user with respect to the feature, wherein the method further comprises:

determining whether to show the user a message based on the qualifications.

13. The method of claim 12, wherein the determining of whether to show the user the message comprises:

determining a likelihood of the user accepting the feature based on an execution of an artificial intelligence (AI) model on the qualifications; and determining whether to show the user the message based on the likelihood.

14. The method of claim 9, comprising:

receiving additional contextual information about the user during the display of the animation;

storing the additional contextual information in a data store; and based on the additional contextual information, performing one or more of augmenting the animation being displayed or selecting a different animation to display.

15. The method of claim 9, comprising:

after the animation and the waiting period have ended, determining that the user has not accepted the feature;

in response to the user not having accepted the feature, retrieving additional contextual information about the user and past transactions of the user; and using an artificial intelligence (AI) model, generating a recommendation for a new feature to offer the user.

16. The method of claim 9, wherein the receiving of the contextual information comprises:

receiving an image of the user, wherein the method further comprises:

executing a facial recognition algorithm on the image of the user to identify a state of the user; and dynamically selecting the animation from a plurality of animation files based on the state and a label assigned to the animation.

17. A non-transitory computer-readable medium comprising instructions that, when executed by a processor, cause the processor to perform:

receiving contextual information corresponding to a user during an inquiry by the user about a feature of a software application;

in response to the inquiry, executing a waiting period for a response to the inquiry;

selecting an animation to display during the waiting period based on the contextual information and the inquiry, wherein the animation provides data associated with the feature;

displaying the animation during the waiting period; and determining if the user has accepted the feature.

18. The non-transitory computer-readable medium of claim 17, wherein the determining if the user has accepted the feature comprises:

determining if the user has accepted the feature within a certain time after one or more of the waiting period or the animation ends.

19. The non-transitory computer-readable medium of claim 17, wherein the determining if the user has accepted the feature comprises:

determining that the user has not accepted the feature within a certain time; and in response to it being determined that the user has not accepted the feature, the method further comprises one or more of:

offering a different feature or selecting a different animation.

20. The non-transitory computer-readable medium of claim 17, wherein the receiving of the contextual information comprises:

receiving qualifications of the user with respect to the feature, wherein the instructions cause the processor to perform:

determining whether to show the user a message based on the qualifications.

* * * * *